United States Patent
Huang et al.

(10) Patent No.: US 12,068,865 B2
(45) Date of Patent: Aug. 20, 2024

(54) TECHNIQUES FOR CODEBLOCK GROUP-BASED TRANSMISSIONS INCLUDING MULTIPLE CODEWORDS

(71) Applicant: QUALCOMM Incorporated, San Diego, CA (US)

(72) Inventors: Yi Huang, San Diego, CA (US); Gokul Sridharan, Sunnyvale, CA (US); Wanshi Chen, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/125,647

(22) Filed: Mar. 23, 2023

(65) Prior Publication Data

US 2023/0353289 A1   Nov. 2, 2023

Related U.S. Application Data

(60) Provisional application No. 63/336,261, filed on Apr. 28, 2022.

(51) Int. Cl.
*H04L 1/00* (2006.01)
*H04L 1/1829* (2023.01)
*H04L 1/1867* (2023.01)

(52) U.S. Cl.
CPC .......... *H04L 1/1861* (2013.01); *H04L 1/1893* (2013.01)

(58) Field of Classification Search
None
See application file for complete search history.

(56) References Cited

U.S. PATENT DOCUMENTS

| | | | |
|---|---|---|---|
| 2019/0089494 A1* | 3/2019 | Park | H04L 1/1812 |
| 2020/0106566 A1* | 4/2020 | Yeo | H04W 28/04 |
| 2020/0351057 A1* | 11/2020 | Yeo | H04L 1/1854 |
| 2020/0351856 A1* | 11/2020 | Yeo | H04L 5/0053 |
| 2020/0403737 A1* | 12/2020 | Yeo | H04L 1/1861 |
| 2021/0075571 A1* | 3/2021 | Manolakos | H04W 72/23 |
| 2021/0400687 A1* | 12/2021 | Yeo | H04W 72/1263 |

* cited by examiner

*Primary Examiner* — Mujtaba M Chaudry
(74) *Attorney, Agent, or Firm* — Holland & Hart LLP

(57) ABSTRACT

Methods, systems, and devices for wireless communications are described. A user equipment (UE) receives a first control message indicating a codeblock group (CBG) scheduling configuration for scheduling CBG-based uplink communications, where the CBG scheduling configuration includes a first mapping configuration associated with uplink communications including a single codeword and a second mapping configuration associated with uplink communications including multiple codewords. The UE receives a second control message scheduling an uplink message including a set of CBGs, where the uplink message is associated with a first codeword, a second codeword, or both. The UE then transmits the uplink message in accordance with the CBG scheduling configuration, where the set of CBGs are mapped to one of the first or second codeword in accordance with the first mapping configuration, or where the set of CBGs are mapped to the first and second codewords in accordance with the second mapping configuration.

30 Claims, 15 Drawing Sheets

TECHNIQUES FOR CODEBLOCK GROUP-BASED TRANSMISSIONS INCLUDING MULTIPLE CODEWORDS

CROSS REFERENCE

The present Application for Patent claims the benefit of U.S. Provisional Patent Application No. 63/336,261 by HUANG et al., entitled "TECHNIQUES FOR CODEBLOCK GROUP-BASED TRANSMISSIONS INCLUDING MULTIPLE CODEWORDS," filed Apr. 28, 2022, assigned to the assignee hereof, and expressly incorporated by reference herein.

FIELD OF TECHNOLOGY

The following relates to wireless communications, including techniques for codeblock group (CBG)-based transmissions including multiple codewords.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support codebook group (CBG)-based wireless communications, where a CBG-based communication includes multiple CBGs. For example, physical downlink shared channel (PDSCH) communications may be configured with up to eight CBGs, where each CBG includes one or more codeblocks. Moreover, some wireless communications may enable downlink CBG-based communications to be transmitted using multiple codewords (e.g., multiple transport blocks (TBs)).

SUMMARY

The described techniques relate to improved methods, systems, devices, and apparatuses that support techniques for codeblock group (CBG)-based transmissions including multiple codewords. Generally, aspects of the present disclosure support signaling and mapping configurations to enable multi-codeword CBG-based uplink communications. In particular, techniques described herein may support CBG scheduling configurations including multiple mapping configurations for CBG-based uplink messages including one or two codewords. For example, a user equipment (UE) may be configured with a CBG scheduling configuration including multiple mapping configurations for mapping CBGs of uplink communications to one or multiple codewords. For instance, the CBG scheduling configuration may include a first mapping configuration for mapping CBGs of an uplink message to a single codeword, and a second mapping configuration for mapping CBGs of an uplink message to multiple codewords. The UE may subsequently receive an uplink grant scheduling a CBG-based uplink message, and may map the CBGs of the uplink message in accordance with the first or second mapping configuration depending on whether the uplink message includes one or two codewords. For single-codeword uplink messages, the single codeword may be mapped to each of the CBGs of the uplink message. Comparatively, for multi-codeword uplink messages, two codewords may be mapped to the CBGs of the uplink message evenly or unevenly (e.g., even or uneven quantities of CBGs mapped to each codeword).

A method is described. The method may include receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, receiving, from the network entity, a second control message scheduling an uplink message including a set of multiple CBGs, where the second control message is associated with a first codeword, a second codeword, or both, and transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

An apparatus is described. The apparatus may include a processor, memory coupled with the processor, and instructions stored in the memory. The instructions may be executable by the processor to cause the apparatus to receive, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, receive, from the network entity, a second control message scheduling an uplink message including a set of multiple CBGs, where the second control message is associated with a first codeword, a second codeword, or both, and transmit the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Another apparatus is described. The apparatus may include means for receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, means for receiving, from the network entity, a second control message scheduling an uplink message including a set of multiple CBGs, where the second control message is associated with a first codeword, a second codeword, or both, and means for transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

A non-transitory computer-readable medium storing code is described. The code may include instructions executable by a processor to receive, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, receive, from the network entity, a second control message scheduling an uplink message including a set of multiple CBGs, where the second control message is associated with a first codeword, a second codeword, or both, and transmit the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Some examples of the method, apparatuses, and non-transitory computer-readable medium described herein may further include operations, features, means, or instructions for receiving, via the first control message, a set of multiple mapping configurations associated with uplink communications including a set of multiple codewords, the set of multiple mapping configurations including the second mapping configuration and receiving, via the second control message, an indication of the second mapping configuration from the set of multiple mapping configurations, where the set of multiple CBGs of the uplink message may be mapped to the first codeword and the second codeword in accordance with the second mapping configuration based on the indication in the second control message.

Some examples of the method, apparatuses, and non-transitory computer-readable medium described herein may further include operations, features, means, or instructions for receiving, via the first control message, the second control message, or both, an indication of a partition of the set of multiple CBGs associated with the second mapping configuration, where the set of multiple CBGs of the uplink message may be mapped to the first codeword and the second codeword in accordance with the second mapping configuration and the partition.

In some examples of the method, apparatuses, and non-transitory computer-readable medium described herein, the partition divides the set of multiple CBGs into a first subset including a first quantity of CBGs and a second subset including a second quantity of CBGs and the partition may be based on one or more parameters associated with the first codeword, the second codeword or both, the one or more parameters including a priority, a transport block size, or both.

Some examples of the method, apparatuses, and non-transitory computer-readable medium described herein may further include operations, features, means, or instructions for receiving, via the second control message, one or more bit field values associated with a set of multiple CBG transmission information fields, where the set of multiple CBG transmission information fields correspond to the set of multiple CBGs, and where the set of multiple CBGs may be mapped to the first codeword, the second codeword, or both, in accordance with the first mapping configuration or the second mapping configuration based on the one or more bit field values.

Some examples of the method, apparatuses, and non-transitory computer-readable medium described herein may further include operations, features, means, or instructions for identifying whether the uplink message may be associated with the first codeword, the second codeword, or both, based on one or more bit fields within the second control message, the one or more bit fields including a modulation and coding scheme (MCS) field, a redundancy version (RV) field, or both and generating the uplink message in accordance with the first mapping configuration or the second mapping configuration based on the identifying.

In some examples of the method, apparatuses, and non-transitory computer-readable medium described herein, the uplink message may be associated with the first codeword and the first codeword may be mapped to each CBG of the set of multiple CBGs in accordance with the first mapping configuration.

In some examples of the method, apparatuses, and non-transitory computer-readable medium described herein, the uplink message may be associated with both the first codeword and the second codeword, the first codeword may be mapped to a first subset of the set of multiple CBGs and the second codeword mapped to a second subset of the set of multiple CBGs in accordance with the second mapping configuration, and the first subset may be different from the second subset.

In some examples of the method, apparatuses, and non-transitory computer-readable medium described herein, the first subset may be associated with a first quantity of CBGs and the second subset may be associated with a second quantity of CBGs that may be equal to the first quantity of CBGs.

In some examples of the method, apparatuses, and non-transitory computer-readable medium described herein, the first subset may be associated with a first quantity of CBGs and the second subset may be associated with a second quantity of CBGs that may be different from the first quantity of CBGs.

In some examples of the method, apparatuses, and non-transitory computer-readable medium described herein, the first control message includes a radio resource control (RRC) message and the second control message includes a downlink control information (DCI) message, a medium access control-control element (MAC-CE) message, or both.

A method is described. The method may include outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, outputting a second control message scheduling an uplink message including a set of multiple CBGs, where the second control message is associated with a first codeword, a second codeword, or both, and obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

An apparatus is described. The apparatus may include a processor, memory coupled with the processor, and instructions stored in the memory. The instructions may be executable by the processor to cause the apparatus to output, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, output a second control message scheduling an uplink message including a set of multiple CBGs, where the second control message is associated with a first codeword, a second codeword, or both, and obtain the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Another apparatus is described. The apparatus may include means for outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, means for outputting a second control message scheduling an uplink message including a set of multiple CBGs, where the second control message is associated with a first codeword, a second codeword, or both, and means for obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

A non-transitory computer-readable medium storing code is described. The code may include instructions executable by a processor to output, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords, output a second control message scheduling an uplink message including a set of multiple CBGs, where the second control message is associated with a first codeword, a second codeword, or both, and obtain the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Some examples of the method, apparatuses, and non-transitory computer-readable medium described herein may further include operations, features, means, or instructions for outputting, via the first control message, a set of multiple mapping configurations associated with uplink communications including a set of multiple codewords, the set of multiple mapping configurations including the second mapping configuration and outputting, via the second control message, an indication of the second mapping configuration from the set of multiple mapping configurations, where the set of multiple CBGs of the uplink message may be mapped to the first codeword and the second codeword in accordance with the second mapping configuration based on the indication in the second control message.

Some examples of the method, apparatuses, and non-transitory computer-readable medium described herein may further include operations, features, means, or instructions for outputting, via the first control message, the second control message, or both, an indication of a partition of the set of multiple CBGs associated with the second mapping configuration, where the set of multiple CBGs of the uplink message may be mapped to the first codeword and the second codeword in accordance with the second mapping configuration and the partition.

In some examples of the method, apparatuses, and non-transitory computer-readable medium described herein, the partition divides the set of multiple CBGs into a first subset including a first quantity of CBGs and a second subset including a second quantity of CBGs and the partition may be based on one or more parameters associated with the first codeword, the second codeword or both, the one or more parameters including a priority, a transport block size, or both.

Some examples of the method, apparatuses, and non-transitory computer-readable medium described herein may further include operations, features, means, or instructions for outputting, via the second control message, one or more bit field values associated with a set of multiple CBG transmission information fields, where the set of multiple CBG transmission information fields correspond to the set of multiple CBGs, and where the set of multiple CBGs may be mapped to the first codeword, the second codeword, or both, in accordance with the first mapping configuration or the second mapping configuration based on the one or more bit field values.

In some examples of the method, apparatuses, and non-transitory computer-readable medium described herein, the uplink message may be associated with the first codeword and the first codeword may be mapped to each CBG of the set of multiple CBGs in accordance with the first mapping configuration.

In some examples of the method, apparatuses, and non-transitory computer-readable medium described herein, the uplink message may be associated with both the first codeword and the second codeword, the first codeword may be mapped to a first subset of the set of multiple CBGs and the second codeword mapped to a second subset of the set of multiple CBGs in accordance with the second mapping configuration, and the first subset may be different from the second subset.

In some examples of the method, apparatuses, and non-transitory computer-readable medium described herein, the first subset may be associated with a first quantity of CBGs and the second subset may be associated with a second quantity of CBGs that may be equal to the first quantity of CBGs.

In some examples of the method, apparatuses, and non-transitory computer-readable medium described herein, the first subset may be associated with a first quantity of CBGs and the second subset may be associated with a second quantity of CBGs that may be different from the first quantity of CBGs.

In some examples of the method, apparatuses, and non-transitory computer-readable medium described herein, the first control message includes an RRC message and the second control message includes a DCI message, a MAC-CE message, or both.

DETAILED DESCRIPTION

Figure 1:
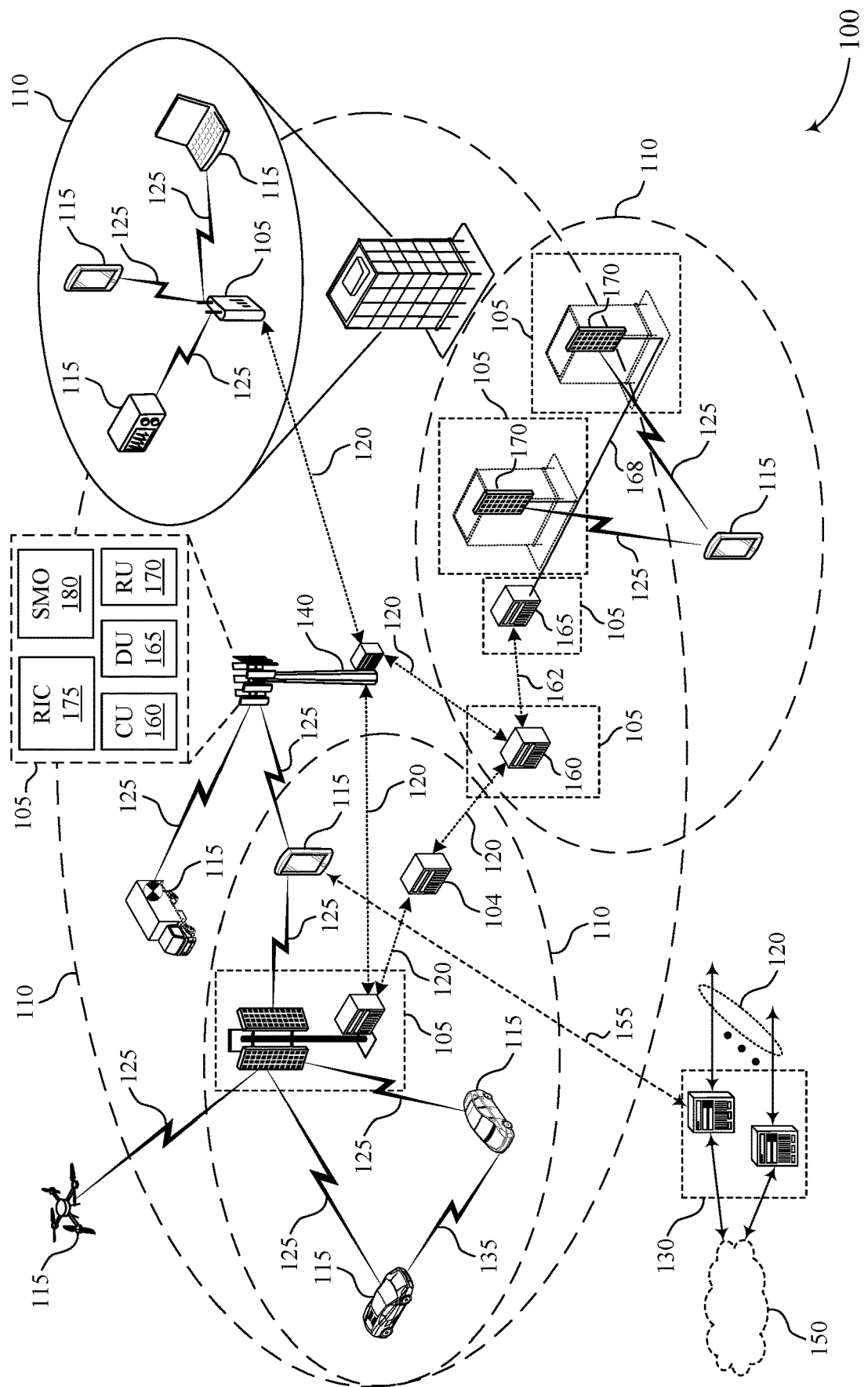
FIG. 1 illustrates an example of a wireless communications system that supports techniques for codeblock group (CBG)-based transmissions including multiple codewords in accordance with one or more aspects of the present disclosure.

Some wireless communications systems may support codebook group (CBG)-based wireless communications, where a CBG-based communication includes multiple CBGs. For example, physical downlink shared channel (PDSCH) communications may be configured with up to eight CBGs, where each CBG includes one or more codeblocks. Moreover, some wireless communications may enable downlink CBG-based communications to be transmitted using multiple codewords (e.g., multiple transport blocks (TBs)). For example, a CBG-based PDSCH communication may include eight CBGs, where CBGs 1-4 correspond to a first codeword, and CBGs 5-8 correspond to a second codeword. However, some conventional wireless communications systems only enable CBG-based uplink communications to be performed using a single codeword, and do not enable CBG-based uplink communications to be performed using multiple codewords.

Accordingly, aspects of the present disclosure are directed to signaling and mapping configurations to enable multi-codeword CBG-based uplink communications. In particular, aspects of the present disclosure may support CBG scheduling configurations including multiple mapping configurations for CBG-based uplink messages including one or two codewords. For example, a UE may be configured with a CBG scheduling configuration including multiple mapping configurations for mapping CBGs of uplink communications to one or multiple codewords. For instance, the CBG scheduling configuration may include a first mapping configuration for mapping CBGs to a single codeword, and a second mapping configuration for mapping CBGs to multiple codewords. The UE may subsequently receive an uplink grant scheduling a CBG-based uplink message, and may map the CBGs of the uplink message in accordance with the first or second mapping configuration depending on whether the uplink message includes one or two codewords.

In the context of single-codeword CBG-based uplink messages, the single codeword may be mapped to each of the CBGs of the uplink message in accordance with a first mapping configuration for single-codeword uplink messages. Comparatively, in the context of multi-codeword uplink messages (e.g., uplink messages including two codewords), two respective codewords of the uplink message may be mapped to the CBGs evenly or unevenly in accordance with additional mapping configurations for multi-codeword uplink messages. For instance, a mapping configuration for multi-codeword uplink messages may cause a UE to map CBGs of an uplink message evenly across the first and second codeword such that the first and second codewords are mapped to even quantities of CBGs. Comparatively, another mapping configuration for multi-codeword uplink messages may cause the UE to map CBGs of an uplink message unevenly across the first and second codeword such that the first and second codewords are mapped to uneven quantities of CBGs. In some cases, for multi-codeword CBG-based uplink messages, the network may indicate which mapping configuration is to be used (e.g., indicate a mapping configuration for even or uneven CBG mapping). Additionally, or alternatively, the network may indicate a partition of the CBGs across the first and second codewords such that the UE maps the CBGs of the uplink message across the first and second codewords in accordance with the partition and a multi-codeword mapping configuration.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for CBG-based transmissions including multiple codewords.

FIG. 1 illustrates an example of a wireless communications system 100 that supports techniques for CBG-based transmissions including multiple codewords in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for CBG-based transmissions including multiple codewords as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, the wireless communications system 200 may support signaling and configurations signaling and mapping configurations to enable multi-codeword CBG-based uplink communications. In particular, the respective devise of the wireless communications system 200 may support CBG scheduling configurations which include multiple mapping configurations for CBG-based uplink messages including one or two codewords. For example, a UE 115 of the wireless communications system 100 may be configured with a CBG scheduling configuration including multiple mapping configurations for mapping CBGs of uplink communications to one or multiple codewords. For instance, the CBG scheduling configuration may include a first mapping configuration for mapping CBGs to a single codeword, and a second mapping configuration for mapping CBGs to multiple codewords. The UE 115 may subsequently receive an uplink grant scheduling a CBG-based uplink message, and may map the CBGs of the uplink message in accordance with the first or second mapping configuration depending on whether the uplink message includes one or two codewords. In this example, UE 115 may transmit the uplink message, and the network entity 105 may know or expect how the CBGs of the uplink message are mapped across the one or more codewords of the uplink message based on the respective mapping configuration which was used.

In the context of single-codeword CBG-based uplink messages, the single codeword may be mapped to each of the CBGs of the uplink message in accordance with a first mapping configuration for single-codeword uplink messages. Comparatively, in the context of multi-codeword uplink messages (e.g., uplink messages including two codewords), two respective codewords of the uplink message may be mapped to the CBGs evenly or unevenly in accordance with additional mapping configurations for multi-codeword uplink messages. For instance, a mapping configuration for multi-codeword uplink messages may cause the UE 115 to map CBGs of an uplink message evenly across the first and second codeword such that the first and second codewords are mapped to even quantities of CBGs.

Comparatively, another mapping configuration for multi-codeword uplink messages may cause the UE 115 to map CBGs of an uplink message unevenly across the first and second codeword such that the first and second codewords are mapped to uneven quantities of CBGs. In some cases, for multi-codeword CBG-based uplink messages, the network may indicate which mapping configuration is to be used (e.g., indicate a mapping configuration for even or uneven CBG mapping). Additionally, or alternatively, the network may indicate a partition of the CBGs across the first and second codewords such that the UE 115 maps the CBGs of the uplink message across the first and second codewords in accordance with the partition and a multi-codeword mapping configuration.

Techniques described herein may enable UEs 115 to perform CBG-based uplink communications associated with one codeword, multiple codewords, or both. In particular, techniques described herein may enable UEs 115 to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system 100.

Figure 2:
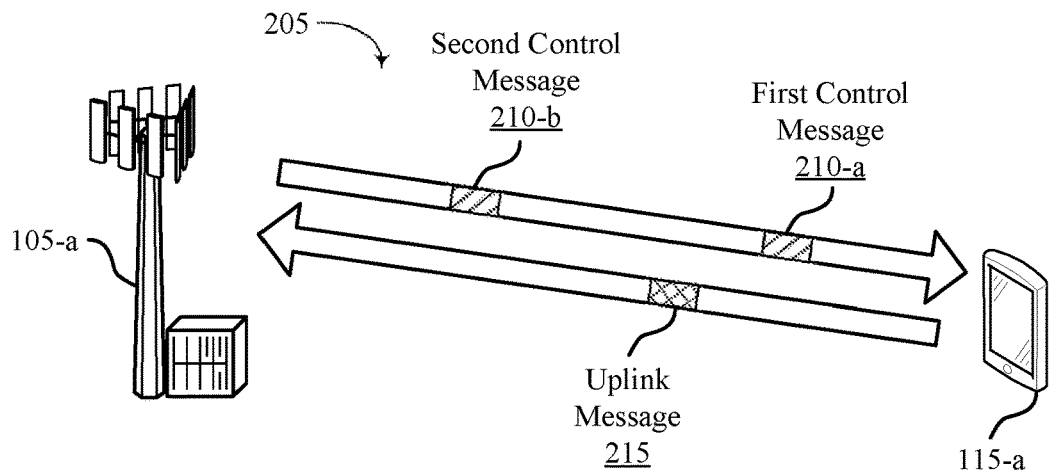
FIG. 2 illustrates an example of a wireless communications system that supports techniques for CBG-based transmissions including multiple codewords in accordance with one or more aspects of the present disclosure.
Figure 2:
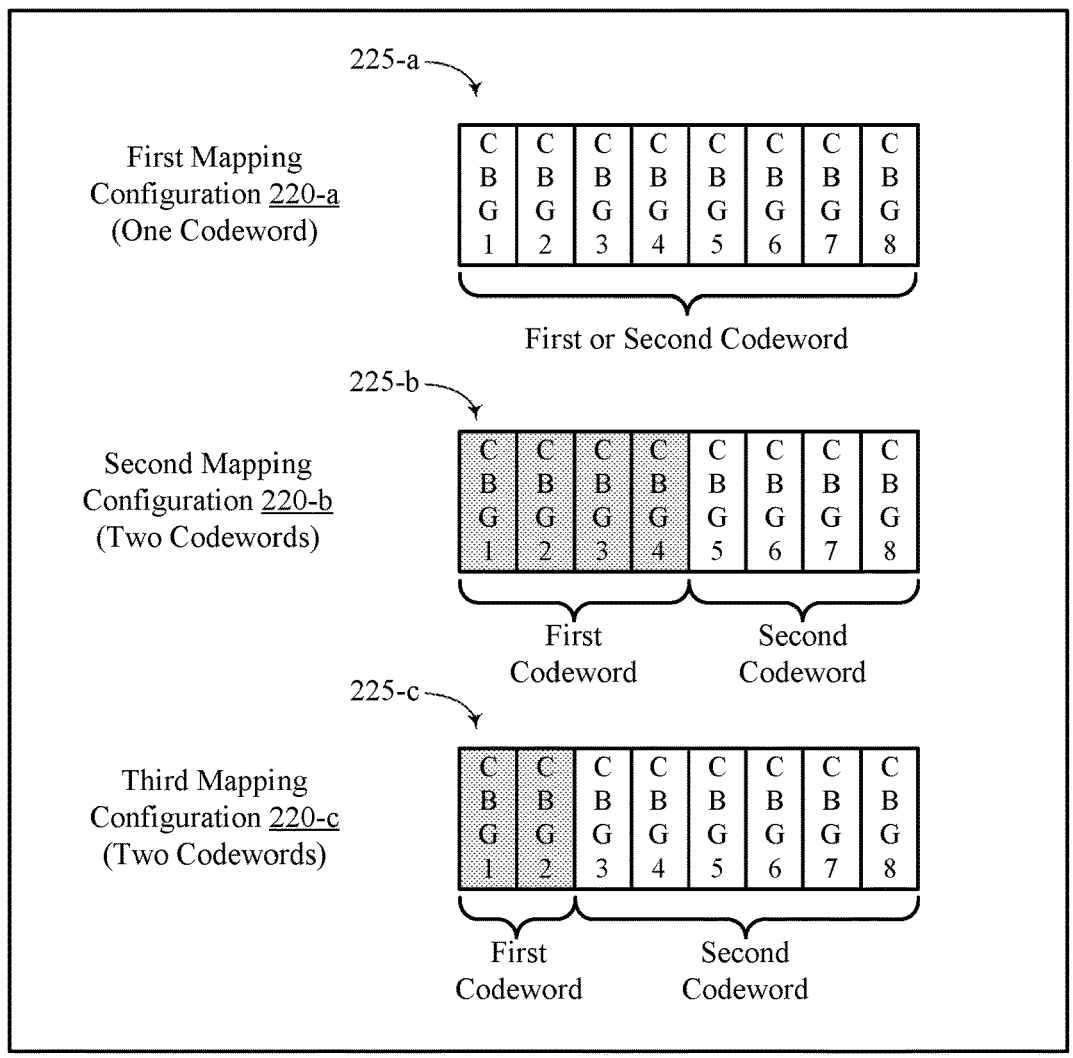

FIG. 2 illustrates an example of a wireless communications system 200 that supports techniques for CBG-based transmissions including multiple codewords in accordance with one or more aspects of the present disclosure. In particular, the wireless communications system 200 may support signaling and mapping configurations for multi-codeword CBG-based uplink communications, as described herein.

The wireless communications system 200 may include a network entity 105-a and a UE 115-a, which may be examples of network entities 105 and UEs 115 as described with reference to FIG. 1. The UE 115-a may communicate with the network entity 105-a using communication link 205, which may be an example of an NR or LTE link between the UE 115-a and the network entity 105-a. In some cases, the communication link 205 between the UE 115-a and the network entity 105-a may include an example of an access link (e.g., Uu link) which may include a bi-directional link that enables both uplink and downlink communication. For example, the UE 115-a may transmit uplink signals, such as uplink control signals or uplink data signals, to one or more components of the network entity 105-a using the communication link 205, and one or more components of the network entity 105-a may transmit downlink signals, such as downlink control signals or downlink data signals, to the UE 115-a using the communication link 205.

As noted previously herein, some wireless communications systems may CBG-based wireless communications, where a CBG-based communication includes multiple CBGs. For example, some wireless communications systems support PDSCH communications to be configured with up to eight CBGs, where each CBG includes one or more codeblocks. Moreover, some wireless communications may enable downlink CBG-based communications to be transmitted using multiple codewords (e.g., multiple TBs). For the purpose of the present disclosure, the term "codeword" may be used to refer to a TB including error protection. As such, for the purposes of the present disclosure, the terms "codeword" and "TB" may be used interchangeably, unless noted otherwise herein.

For example, a CBG-based PDSCH message may include eight CBGs, where CBGs 1-4 correspond to a first codeword, and CBGs 5-8 correspond to a second codeword. In some aspects, a single codeword may be mapped to up to four layers. As such, PDSCH communications including more than four layers may include more than one codeword, as each codeword is only mapped to a maximum of four layers. For example, of a CBG-based PDSCH message with eight layers, each of the first and second codeword may map up to four layers, where the first codeword maps to layers 0-3, and the second codeword maps to layers 4-7.

In the context of CBG-based downlink communications including two codewords/TBs, each codeword/TB may configure up to four CBGs. In other words, each codeword may be mapped to up to four CBGs. As such, in some cases, a downlink message (e.g., PDSCH) may include up to eight CBGs with two codewords. As will be described in further detail herein, downlink grants for CBG-based downlink messages may include 2X bits associated with CBG transmission information (CBGTI) fields, where X≤4. In such cases, the first X number of CBGTI bits within the downlink grant may be associated with (e.g., dedicated for) the first codeword, and the second X number of CBGTI bits within the downlink grant may be associated with (e.g., dedicated for) the second codeword.

If a downlink grant schedules an uplink message associated with a single codeword, the X number of bits associated with the other codeword/TB may be wasted, or obsolete. For example, if a DCI scheduling a CDG-based downlink message schedules a PDSCH associated with only the first codeword, the second X number of CBGTI bits within the DCI associated with the second codeword may go unused, and are therefore wasted. Conversely, if a DCI scheduling a CBG-based downlink message schedules a PDSCH associated with only the second codeword, the first X number of CBGTI bits within the DCI associated with the first codeword may go unused, and are therefore wasted. As such, some conventional techniques for scheduling CBG-based downlink communications may lead to wasted resources.

Moreover, some conventional wireless communications systems only enable CBG-based uplink communications to be performed using a single codeword, and do not enable CBG-based uplink communications to be performed using multiple codewords. As such, in some wireless communications systems, the network may be required to schedule separate uplink messages in order to schedule separate codewords, which may lead to increased control signaling, and a less efficient use of resources.

Accordingly, the UE 115-a and the network entity 105-a of the wireless communications system 100 may support signaling and mapping configurations which enable the UE 115-a to perform multi-codeword CBG-based uplink communications. In particular, the wireless communications system 100 may support CBG scheduling configurations including multiple mapping configurations for CBG-based uplink messages including one or two codewords. In such cases, the UE 115-a may be configured to utilize different mapping configurations of the CBG scheduling configuration to map CBGs of scheduled uplink messages depending on whether the scheduled uplink message is associated with one or two (or more) codewords. As such, techniques described herein may enable the network entity 105-a to schedule a single CBG-based uplink communications including multiple codewords, which may reduce control signaling and improve resource utilization within the wireless communications system 100.

For example, as shown in FIG. 2, the UE 115-a may receive, from the network entity 105-a, a first control message 210-a indicating a CBG scheduling configuration for scheduling CBG-based uplink communications. The first control message 210-a may include an RRC message, a system information message (e.g., synchronization signal block (SSB)), a downlink control information (DCI) message, or any combination thereof.

In some aspects, the CBG scheduling configuration may include multiple mapping configurations 220 for mapping CBGs 225 of scheduled uplink messages 215 across one or more codewords/TBs. In other words, the CBG scheduling configuration may indicate or include a set of candidate mapping configurations 220 which may be used by the UE 115-a to map sets of CBGs 225 of scheduled uplink messages 215 across one or more codewords. In particular, the CBG scheduling configuration may include at least one mapping configuration 220 usable for single-codeword uplink messages 215 (e.g., first mapping configuration 220-

*a*), and at least one mapping configuration usable for multi-codeword uplink messages 215 (e.g., second mapping configuration 220-*b*, third mapping configuration), as will be described in further detail herein.

Subsequently, the UE 115-*a* may receive, from the network entity 105-*a*, a second control message 210-*b* scheduling an uplink message 215 including a set of CBGs 225. In other words, the second control message 210-*b* may include an uplink grant which schedules the UE 115-*a* to transmit a CBG-based uplink message 215 (e.g., PUSCH message, PUCCH message) including a set of CBGs 225. In some aspects, the scheduled uplink message 215 may be associated with a first codeword, a second codeword, or both. In this regard, the uplink message 215 may include a CBG-based uplink message 215 associated with one or more codewords.

The UE 115-*a* may be configured to utilize different mapping configurations 220 to generate the scheduled uplink message 215 based on whether the uplink message 215 is associated with one or multiple codewords. In this regard, the UE 115-*a* may be configured to determine which (and how many) codewords are associated with the scheduled uplink message 215, and may select which mapping configuration 220 will be used to generate the CBG-based uplink message 215 based on how many codewords are associated with the uplink message 215.

The UE 115-*a* may determine whether the uplink message 215 scheduled via the second control message 210-*b* is associated with (e.g., includes) the first codeword, the second codeword, or both. In some aspects, the UE 115-*a* may be configured to determine whether the scheduled uplink message 215 is associated with the first codeword, the second codeword, or both, based on one or more bit fields within the second control message 210-*b*. Bit field values used to determine which (or how many) codewords are associated with the uplink message 215 may include, but are not limited to, modulation and coding scheme (MCS) fields, redundancy version (RV) fields, or both. In particular, second control message 210-*b* may include MCS fields, new data indicator (NDI) fields, and RV fields for each of the codewords (e.g., first set of MCS, NDI, and RV fields associated with the first codeword, second set of MCS, NDI, and RV fields associated with the second codeword), where values of the MCS fields and/or RV fields may be used to indicate whether or not the scheduled uplink message 215 includes the first codeword and/or the second codewords.

For instance, if the MCS fields for the second codeword are set to 27 (MCS=27) and the RV fields for the second codeword are set to 1 (RV=1) within the second control message 210-*b*, the UE 115-*a* may determine that the scheduled uplink message 215 is not associated with (does not include) the second codeword, and is therefore associated with only the first codeword. Comparatively, neither the MCS fields nor RV fields for both the first and second codewords are set to the specified values (e.g., if MCS≠27 and/or RV≠1 for both the first and second codewords), the UE 115-*a* may determine that the uplink message 215 scheduled by the second control message 210-*b* is associated with both the first and second codewords.

In some aspects, the second control message 210-*b* may include one or more bit field values associated with a set of CBGTI fields corresponding to the set of CBGs 225 of the scheduled uplink message 215. For example, in the context of an uplink message 215 including eight CBGs 225, the second control message 210-*b* may include eight separate CBGTI fields corresponding to the eight CBGs 225, where bit field values of the respective CBGTI fields may indicate whether the corresponding CBG is to be mapped to the first or second codeword. Stated differently, in a DCI message (e.g., second control message 210-*b*) scheduling a PUSCH message (e.g., CBG-based uplink message 215), a CBGTI field may include up to eight bits, where each bit corresponds to one CBG 225 of the uplink message, and indicates either transmission or retransmission of the respective CBG 225. For instance, the second control message 210-*b* may include a first CBGTI bit associated with CBG1, a second CBGTI bit associated with CBG2, etc.

In some implementations, the second control message 210-*b* (e.g., DCI, MAC-CE) may indicate which mapping configuration 220 is to be used. For example, in some implementations, the first control message 210-*a* may indicate a set of candidate or potential mapping configurations 220 associated with the CBG scheduling configuration usable for multi-codeword uplink communications (e.g., second mapping configuration 220-*b* and third mapping configuration 220-*c*). In this example, the second control message 210-*b* may schedule an uplink message 215 including two codewords, and may indicate which of the mapping configurations 220-*b* or 220-*c* associated with uplink communicants including multiple codewords is to be used.

In additional or alternative implementations, in cases where the second control message 210-*b* schedules an uplink message 215 including two codewords, the second control message 210-*b* may indicate a partition of the set of CBGs 225 of the uplink message 215 across the respective codewords. For example, the uplink message 215 may be associated with a first codeword and a second codeword, and the second control message 210-*b* may indicate a partition of the set of CBGs 225 across the first and second codeword. In other words, the partition may indicate which CBGs 225 of the uplink message 215 are to be mapped to the first codeword, and which of the CBGs 225 of the uplink message 215 are be mapped to the second codeword. Stated differently, the partition may divide the CBGs 225 of the uplink message 215 into a first subset of CBGs 225 and a second subset of CBGs 225, where the first subset of CBGs 225 is mapped to the first codeword and the second subset of CBGs 225 is mapped to the second codeword.

For example, in some cases, the first control message 210-*a*, the second control message 210-*b*, or both, may indicate a partition that divides up CBGs 225 of an uplink message 215 evenly across a first codeword and a second codeword. For instance, the first control message 210-*a*, the second control message 210-*b*, or both, may indicate an even partition of CBGs 225 across the first and second codeword, as shown in the second mapping configuration 220-*b*. By way of another example, in some cases, the first control message 210-*a*, the second control message 210-*b*, or both, may indicate a partition that divides up CBGs 225 of an uplink message 215 unevenly across a first codeword and a second codeword. For instance, the first control message 210-*a*, the second control message 210-*b*, or both, may indicate an uneven partition of CBGs 225 across the first and second codeword, as shown in the third mapping configuration 220-*c*.

In some aspects, the partition may divide the CBGs 225 of a multi-codeword uplink message 215 into multiple subsets based on one or more parameters associated with the first codeword, the second codeword, network conditions, and the like. In particular, the partition may be based on relative priorities of the first and second codewords, relative sizes (e.g., transport block sizes) of the first and second codeword, and the like.

For example, referring to the third mapping configuration 220-c, the second codeword of the uplink message 215 may be associated with a higher priority compared to the first codeword of the uplink message 215. As such, in this example, the partition associated with the third mapping configuration 220-c may divide the CBGs 225 of the uplink message 215 such that more CBGs 225 are allocated to (e.g., mapped to) the second codeword based on the higher priority. By way of another example, in cases where the second codeword of the uplink message 215 is associated with a larger transport block size compared to the first codeword of the uplink message 215, the partition associated with the third mapping configuration 220-c may divide the CBGs 225 of the uplink message 215 such that more CBGs 225 are allocated to (e.g., mapped to) the second codeword based on the larger transport block size.

Upon receiving the second control message 210-b scheduling the uplink message 215, the UE 115-a may be configured to determine how many codewords are associated with the scheduled uplink message 215, and may select/determine the partition and/or mapping configuration 220 that will be used to generate the scheduled uplink message 215. In particular, the UE 115-a may select which mapping configuration 220 will be used based on whether the uplink message 215 is associated with one or two (or more) codewords.

For example, in cases where the scheduled uplink message 215 is associated with one codeword (e.g., either the first codeword or the second codeword), the UE 115-a may generate the uplink message 215 in accordance with the first mapping configuration 220-a illustrated in FIG. 2. For instance, to generate the uplink message 215 associated with the second codeword, the first mapping configuration 220-a may cause the UE 115-a to map each CBG 225-a of the uplink message 215 to the second codeword. The first mapping configuration 220-a may enable a dynamic partition of a quantity of CBGs 225 across one or two codewords. Stated differently, if the second control message 210-b schedules an uplink message 215 including a single codeword, all of the CBGTI bits of the second control message 210-b may be used to indicate the mapping of the CBGs 225-a for the single codeword.

In this regard, the first mapping configuration 220-a may dynamically use the 2X quantity of CBGTI bits in the uplink grant (e.g., second control message 210-b), based on whether the grant schedules one or two codewords. In particular, if the grant (second control message 210-b) schedules an uplink message 215 including a single codeword, the codeword may be associated with 2X CBGs 225 of the uplink message 215, where all 2X CBGTI bits are used to indicate CBGs 225 for the respective codeword (which may change CBG grouping for a first transmission and retransmission of a PUSCH).

Comparatively, if the grant (e.g., second control message 210-b) schedules an uplink message 215 including two codewords (e.g., the first and second codewords), the 2X CBGs 225 and corresponding CBGTI bits within the grant for the two codewords may be spit across the two respective codewords, where each codeword is associated with has X CBGs 225 and X CBGTI bits.

For example, in additional or alternative implementations, the second control message 210-b may schedule the uplink message 215 including/associated with the first codeword and the second codeword. In such cases, the UE 115-a may generate the uplink message 215 in accordance with the second mapping configuration 220-b or the third mapping configuration 220-c illustrated in FIG. 2. In some aspects, the first control message 210-a and/or the second control message 210-b may indicated which of the second mapping configuration 220-b or third mapping configuration 220-c is to be used. In some aspects, the UE 115-a may determine whether to utilize the second or third mapping configuration 220-b, 220-c based on a partition of CBGs 225 which was indicated via the first control message 210-a, the second control message 210-b, or both. In additional or alternative implementations, it may be left up to UE 115-a implementation to select which of the second mapping configuration 220-b or third mapping configuration 220-c (or another mapping configuration 220) will be used to generate multi-codeword uplink messages 215.

In cases where the UE 115-a generates the uplink message 215 in accordance with the second mapping configuration 220-b, the UE 115-a may map the CBGs 225-b of the uplink message 215 evenly across the first and second codeword. In other words, the first codeword and the second codeword may be mapped to equal quantities of CBGs 225. In this regard, the second mapping configuration 220-b may enable a static and even partition of CBGs 225 cross up to two codewords/TBs. In this example, the second control message 210-b (e.g., grant) may schedule up to 2X CBGs, with 2X CBGTI bits in the uplink grant, where the first X CBGTI bits correspond to the first codeword and the second X CBGTI bits correspond to the second codeword.

In some cases, the UE 115-a may be configured to implement the second mapping configuration 220-b for all scheduled uplink messages 215, regardless of whether the uplink message includes one or two codewords. In such cases, if the UE 115-a is scheduled to perform an uplink message 215 including a single codeword, some CBGTI bits in the uplink grant may be wasted, or become obsolete. In particular, if the UE 115-a is configured with the second mapping configuration 220-b, and if an uplink grant schedules a single codeword, then only the X bits corresponding to the scheduled codeword are used, where the remaining X bits are wasted, or obsolete. For example, in some cases, the UE 115-a configured with the second mapping configuration may be scheduled to perform an uplink message 215 associated with only the first codeword. In this example, the first X CBGTI bits (e.g., first four bits) of the uplink grant may be used to indicate the mapping for the first codeword, where the second X bits (e.g., last four bits) of the uplink grant may go wasted (e.g., are obsolete) since the scheduled uplink message does not include the second codeword.

In additional or alternative implementations, the UE 115-a may be configured to generate the uplink message 215 in accordance with the third mapping configuration 220-c. In such cases, the UE 115-a may map the CBGs 225-c of the uplink message 215 unevenly across the first and second codeword. In other words, the first codeword and the second codeword may be mapped to different quantities of CBGs 225. Stated differently, the third mapping configuration may enable uneven partition CBGs 225 cross up to two codewords/TBs, where one codeword may be mapped to X number of CBGs 225 and the other codeword is mapped to Y number of CBGs 225, where X≠Y.

For example, as shown in FIG. 2, the first codeword may be mapped to two CBGs 225, where the second codeword may be mapped to six CBGs. The relative partition of the CBGs 225-c across the first and second codewords within the third mapping configuration 220-c may be indicated by the first control message 210-a, the second control message 210-b, or both. In this regard, the uneven partition of CBGs 225 across the first and second codewords may be indicated semi-statically, dynamically, or both. For example, RRC signaling (e.g., first control message 210-*a*) may semi-statically indicate the uneven partition associated with the third mapping configuration 220-*c*, such as {2,6} (as illustrated in FIG. 2), {3, 5}, {6, 2}, etc., for {CW1/TB1, CW2/TB2}. By way of another example, DCI signaling (e.g., second control message 210-*b*) may dynamically signal the uneven partition. For instance, a DCI message may include three bits to indicate the uneven partition, where the three bits may indicate that the first codeword/TB is to be mapped to some quantity of CBGs 225 (e.g., three bits indicate first codeword is mapped to {1, 2, 3, 4, 5, 6, 7} CBGs).

Moreover, as noted previously herein, the uneven partition of the CBGs 225-*c* across the first and second codewords within the third mapping configuration 220-*c* may be based on relative priorities of the first and second codewords, relative sizes of the respective codewords, or both. For example, the third mapping configuration 220-*c* may cause the UE 115-*a* to assign or map a larger quantity of CBGs 225 to the codeword/TB with the larger TB size, to the codeword with the higher PHY layer priority (e.g., for URLLC), or both.

Subsequently, upon generating the uplink message 215 in accordance with a mapping configuration 220, the UE 115-*a* may transmit the uplink message 215 to the network entity 105-*a*. In some implementations, the network entity 105-*a* may know or expect which mapping configuration 220 (and/or what partition) will be used to generate the uplink message 215, and may therefore know or expect the relative mapping of the CBGs 225 of the uplink message 215 received across the respective codewords. As such, techniques described herein may enable the network entity 105-*a* to efficiently and reliably determine (or expect) which CBGs 225 of the uplink message 215 are mapped to which codeword, which may thereby facilitate more efficient decoding at the network entity 105-*a*, reduce processing resources, and reduce network power consumption.

Techniques described herein may enable the UE 115-*a* to perform CBG-based uplink communications associated with one codeword, multiple codewords, or both. In particular, techniques described herein may enable the UE 115-*a* to be scheduled to perform CBG-based uplink messages 215 including one or multiple codewords, and map the CBGs 225 of the uplink messages 215 in accordance with different mapping configurations 220 based on whether the uplink message 215 is associated with one codeword or multiple codewords. As such, techniques described herein may enable the network to schedule multi-codeword CBG-based uplink communications, thereby preventing the need for the network to schedule separate uplink messages 215 for separate codewords. As such, aspects of the present disclosure may enable more efficient uplink scheduling, and reduce network traffic within the wireless communications system.

Figure 3:
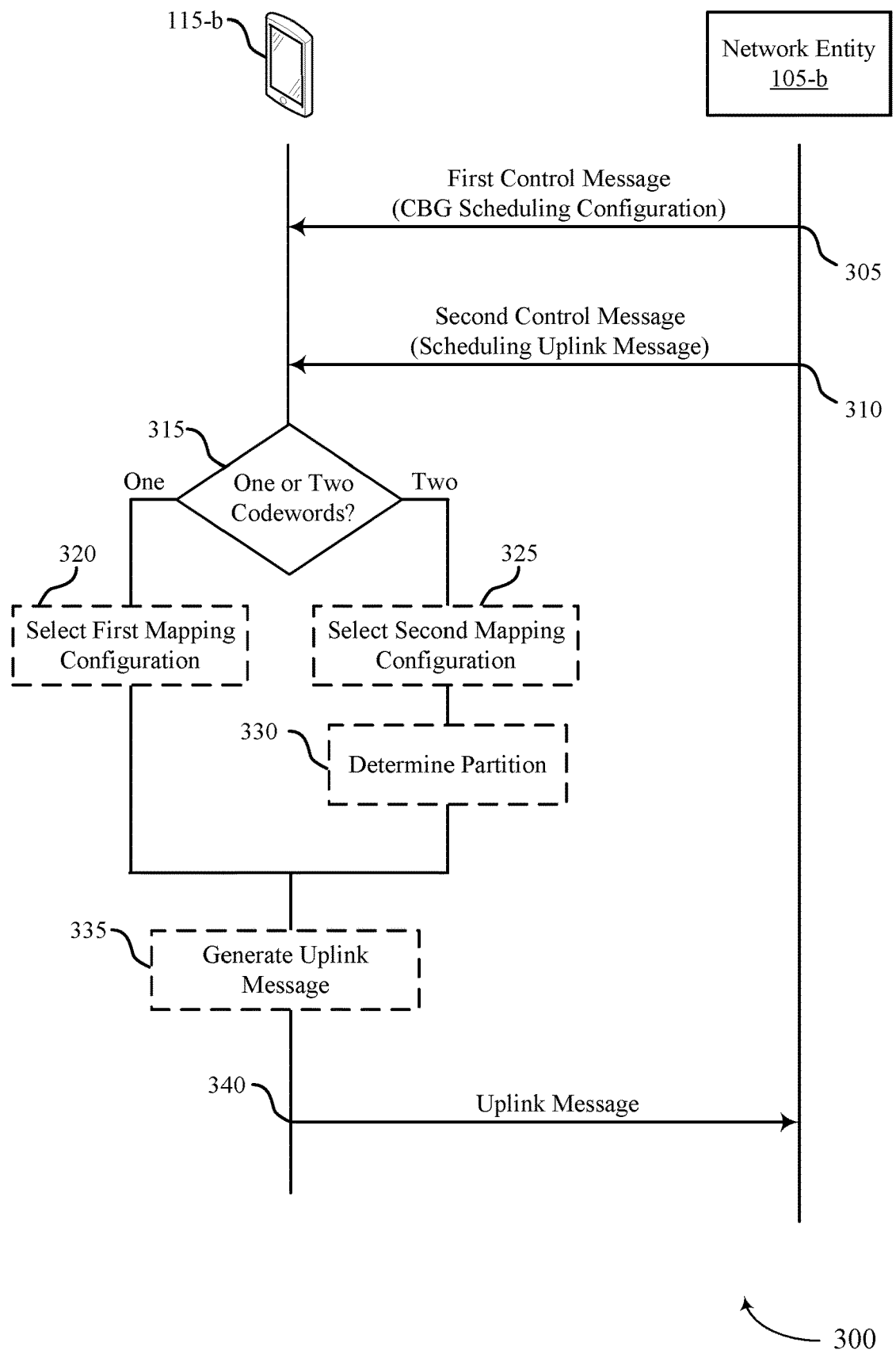
FIG. 3 illustrates an example of a process flow that supports techniques for CBG-based transmissions including multiple codewords in accordance with one or more aspects of the present disclosure.

FIG. 3 illustrates an example of a process flow 300 that supports techniques for CBG-based transmissions including multiple codewords in accordance with one or more aspects of the present disclosure. In some examples, aspects of the process flow 300 may implement, or be implemented by, aspects of the wireless communications system 100, the wireless communications system 200, or both. In particular, the process flow 300 illustrates a UE 115-*b* being configured with a CBG scheduling configuration, being scheduled to perform a CBG-based uplink communication, and mapping CBGs of the uplink message in accordance with a mapping configuration depending on whether the uplink message is associated with one or two codewords, among other aspects.

The process flow 300 may include a UE 115-*b* and a network entity 105-*b*, which may be examples of UEs 115 and network entities 105 as described with reference to FIGS. 1-2. For example, the UE 115-*b* and the network entity 105-*b* illustrated in FIG. 3 may be examples of the UE 115-*a* and the network entity 105-*b*, respectively, as illustrated in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may receive, from the network entity 105-*b*, a first control message indicating a CBG scheduling configuration for scheduling CBG-based uplink communications. The first control message may include an RRC message, a system information message (e.g., SSB), a DCI message, or any combination thereof.

In some aspects, the CBG scheduling configuration may include multiple mapping configurations for mapping CBGs of scheduled uplink messages across one or more codewords/TBs. In other words, the CBG scheduling configuration may indicate or include a set of candidate mapping configurations which may be used by the UE 115-*a* to map CBGs of scheduled uplink messages across one or more codewords.

For example, the CBG scheduling configuration may include a first mapping configuration associated with uplink communications including a single codeword, and a second mapping configuration associated with uplink communications including multiple codewords (e.g., uplink communications including two or more codewords). The first mapping configuration associated with single-codeword uplink messages may cause the UE 115-*b* to map each CBG of a scheduled uplink message to the single codeword associated with the uplink message (e.g., the single codeword is mapped to each CBG), as shown in the mapping configuration 220-*a* illustrated in FIG. 2.

The CBG scheduling configuration may indicate or include one or more mapping configurations associated with multi-codeword uplink messages (e.g., uplink messages including two codewords). For example, a multi-codeword mapping configuration may cause the UE 115-*b* to map CBGs of a scheduled uplink message evenly across a first codeword and a second codeword (e.g., each codeword is mapped to the same number of CBGs), as shown in the mapping configuration 220-*b* illustrated in FIG. 2. By way of another example, another multi-codeword mapping configuration may cause the UE 115-*b* to map CBGs of a scheduled uplink message unevenly across a first codeword and a second codeword (e.g., each codeword is mapped to a different number of CBGs), as shown in the mapping configuration 220-*c* illustrated in FIG. 2.

In some aspects, the first control message may indicate a partition that is to be used for mapping configurations used for mapping CBGs of an uplink message across two or more codewords. In other words, in the context of uplink messages associated with a first codeword and second codeword, the first control signaling may indicate a partition which indicates how CBGs of the scheduled uplink message are to be mapped across the first codeword and the second codeword. In other words, the partition may indicate which CBGs of the uplink message are to be mapped to the first codeword, and which of the CBGs of the uplink message are be mapped to the second codeword.

At 310, the UE 115-*b* may receive, from the network entity 105-*b*, a second control message scheduling an uplink message including a set of CBGs. In other words, the second control message may include an uplink grant which schedules the UE 115-*b* to transmit a CBG-based uplink message (e.g., PUSCH message, PUCCH message). In some aspects, the scheduled uplink message may be associated with a first codeword, a second codeword, or both. In this regard, the uplink message may include a CBG-based uplink message associated with one or more codewords. The UE 115-*b* may receive (and the network entity 105-*b* may output/transmit) the second control message at 310 based on receiving/transmitting the first control message at 305.

In some aspects, the second control message may include one or more bit field values associated with a set of CBGTI fields corresponding to the set of CBGs of the scheduled uplink message. For example, in the context of an uplink message including eight CBGs, the second control message may include eight separate CBGTI fields corresponding to the eight CBGs, where bit field values of the respective CBGTI fields may indicate whether the corresponding CBG is to be mapped to the first or second codeword.

In some implementations, the second control message (e.g., DCI, MAC-CE) may indicate which mapping configuration is to be used. For example, in some implementations, the first control message at 305 may indicate a set of candidate or potential mapping configurations associated with the CBG scheduling configuration usable for multi-codeword uplink communications. In this example, the second control message may schedule an uplink message including two codewords, and may indicate which of the mapping configurations associated with uplink communicants including multiple codewords is to be used.

In additional or alternative implementations, in cases where the second control message schedules an uplink message including two codewords, the second control message at 310 may indicate a partition of the set of CBGs of the uplink message across the respective codeword. For example, the uplink message may be associated with a first codeword and a second codeword, and the second control message may indicate a partition of the set of CBGs across the first and second codeword. In other words, the partition may indicate which CBGs of the uplink message are to be mapped to the first codeword, and which of the CBGs of the uplink message are be mapped to the second codeword. Stated differently, the partition may divide the CBGs of the uplink message into a first subset of CBGs and a second subset of CBGs, where the first subset of CBGs is mapped to the first codeword and the second subset of CBGs is mapped to the second codeword.

In additional or alternative implementations, the partition used to divide CBGs across the multiple codewords may be indicated via the first control message at 305. As such, the partition of CBGs within a multi-codeword CBG-based uplink message may be indicated via the first control message at 305, via the second control message at 310, or both.

In some aspects, the partition may divide the CBGs of a multi-codeword uplink message into multiple subsets based on one or more parameters associated with the first codeword, the second codeword, network conditions, and the like. In particular, the partition may be based on relative priorities of the first and second codewords, relative sizes (e.g., transport block sizes) of the first and second codeword, and the like.

For example, in cases where the first codeword of an uplink message is associated with a higher priority compared to the second codeword of the uplink message, the partition associated with the respective mapping configuration may divide the CBGs of the uplink message such that more CBGs are allocated to (e.g., mapped to) the first codeword based on the higher priority. By way of another example, in cases where the second codeword of the uplink message is associated with a larger transport block size compared to the first codeword of the uplink message, the partition associated with the respective mapping configuration may divide the CBGs of the uplink message such that more CBGs are allocated to (e.g., mapped to) the second codeword based on the larger transport block size.

At 315, the UE 115-*b* may determine whether the uplink message scheduled via the second control message is associated with (e.g., includes) one or two codewords. In other words, the UE 115-*b* may determine whether the uplink message is associated with the first codeword, the second codeword, or both. The UE 115-*b* may perform the determination at 315 based on receiving the first control message at 305, receiving the second control message at 310, or both.

The UE 115-*b* may be configured to determine whether the scheduled uplink message is associated with the first codeword, the second codeword, or both, based on one or more bit fields within the second control message. Bit field values used to determine which (or how many) codewords are associated with the uplink message may include, but are not limited to, MCS fields, RV fields, or both. In particular, second control message may include MCS fields, NDI fields, and RV fields for each of the codewords (e.g., first set of MCS, NDI, and RV fields associated with the first codeword, second set of MCS, NDI, and RV fields associated with the second codeword), where values of the MCS fields and/or RV fields may be used to indicate whether or not the scheduled uplink message includes the first codeword and/or the second codewords. For instance, if the MCS fields for the second codeword are set to 27 (MCS=27) and the RV fields for the second codeword are set to 1 (RV=1), the UE 115-*b* may determine that the scheduled uplink message is not associated with (does not include) the second codeword, and is therefore associated with only the first codeword.

If the UE 115-*b* determines that the scheduled uplink message is associated with one codeword (e.g., either the first codeword or the second codeword) (Step 315=One), the process flow 300 may proceed to 320.

At 320, the UE 115-*b* may select the first mapping configuration associated with uplink communications including a single codeword. In particular, the UE 115-*b* may select the first mapping configuration for single-codeword uplink communications based on determining that the scheduled uplink message is associated with one of the first or second codewords at 315. In other words, the UE 115-*b* may determine that the CBGs of the scheduled uplink message are to be mapped to the single codeword of the uplink message in accordance with the first mapping configuration.

The UE 115-*b* may select the first mapping configuration at 320 in accordance with the CBG mapping configuration which was indicated via the first control message at 305. In this regard, the UE 115-*b* may select the first mapping configuration based on receiving the first control message at 305, receiving the second control message at 310, performing the determination at 315, or any combination thereof. For example, in some implementations, the first mapping configuration may be indicated via the first control message, the second control message, or both.

Comparatively, if the UE 115-*b* determines that the scheduled uplink message is associated with one codeword (e.g., either the first codeword or the second codeword) (Step 315-Two), the process flow 300 may proceed to 325.

At 325, the UE 115-*b* may select the second mapping configuration associated with uplink communications including multiple codewords. In particular, the UE 115-*b* may select the second mapping configuration for multi-codeword uplink communications based on determining that the scheduled uplink message is associated with both the first and second codewords at 315. In other words, the UE 115-*b* may determine that the CBGs of the scheduled uplink message are to be mapped to both the first codeword and the second codeword of the uplink message in accordance with the second mapping configuration.

The UE 115-*b* may select the second mapping configuration at 325 in accordance with the CBG mapping configuration which was indicated via the first control message at 305. In this regard, the UE 115-*b* may select the first mapping configuration based on receiving the first control message at 305, receiving the second control message at 310, performing the determination at 315, or any combination thereof. For example, in some implementations, the second mapping configuration may be indicated via the first control message, the second control message, or both.

At 330, the UE 115-*b* may determine the partition associated with the second mapping configuration. In other words, the UE 115-*b* may determine the partition that is to be applied to the CBGs of the scheduled uplink message to divide up the CBGs of the uplink message across the first codeword and the second codeword. As noted previously herein, the partition may be indicated via the first control message, the second control message, or both. Additionally, or alternatively, the UE 115-*b* may determine the partition based on the second mapping configuration selected at 325.

At 335, the UE 115-*b* may generate the CBG-based uplink message which was scheduled via the second control message at 310. When generating the uplink message, the UE 115-*b* may map the set of CBGs of the uplink message to the one or more codewords of the uplink message in accordance with the respective mapping configuration. In this regard, the UE 115-*b* may generate the uplink message at 335 based on receiving the first control message at 305, receiving the second control message at 310, determining whether the uplink message includes one or two (or more) codewords at 315, selecting the respective mapping configuration at 320 or 325, determining the partition at 330, or any combination thereof.

For example, in cases where the uplink message is associated with only the second codeword, the UE 115-*b* may select the first mapping configuration at 320, and may map the CBGs of the uplink message to the second codeword in accordance with the first mapping configuration. In this example, the first mapping configuration may cause the UE 115-*b* to map each CBG of the uplink message to the second codeword (e.g., each CBG is mapped to the second codeword), as shown in the mapping configuration 220-*a* illustrated in FIG. 2.

By way of another example, in cases where the uplink message is associated with both the first codeword and the second codeword, the UE 115-*b* may select the second mapping configuration at 325, and may map the CBGs of the uplink message to the first codeword and the second codeword in accordance with the second mapping configuration. Additionally, or alternatively, the UE 115-*b* may the CBGs of the uplink message to the first codeword and the second codeword in accordance with partition which was determined at 330. For instance, the second mapping configuration, the partition, or both, may cause the UE 115-*b* to map the CBGs of the uplink message evenly across the first and second codewords (e.g., equal quantities of CBGs mapped to the first and second codewords), as shown in the mapping configuration 220-*b* illustrated in FIG. 2. Comparatively, in other implementations, the second mapping configuration, the partition, or both, may cause the UE 115-*b* to map the CBGs of the uplink message unevenly across the first and second codewords (e.g., different quantities of CBGs mapped to the first and second codewords), as shown in the mapping configuration 220-*c* illustrated in FIG. 2.

At 340, the UE 115-*b* may transmit the uplink message to the network entity 105-*b*. The UE 115-*b* may transmit the CBG-based uplink message to the network entity 105-*b* based on generating the uplink message, and in accordance with the CBG scheduling configuration. In particular, the UE 115-*b* may transmit the uplink message at 340 in accordance with the respective mapping configuration used to map CBGs of the uplink message across the one or more codewords of the uplink message.

While the description of the process flow 300 is primarily focused on the determinations and selections performed by the UE 115-*b*, this is not to be understood as a limitation of the present disclosure. In other words, the network entity 105-*b* may additionally or alternatively perform the various steps and functions shown and described in FIG. 3, including determining whether the uplink message is associated with one or two codewords at 315, selecting the respective mapping configuration at 320 and/or 325, determining the partition at 330, or any combination thereof. Stated differently, the network entity 105-*b* may know or expect which mapping configuration (and/or what partition) will be used to generate the uplink message at 335, and may therefore know or expect the relative mapping of the CBGs of the uplink message received at 340 across the respective codewords. As such, techniques described herein may enable the network entity 105-*b* to efficiently and reliably determine (or expect) which CBGs of the uplink message are mapped to which codeword, which may thereby facilitate more efficient decoding at the network entity 105-*b*, reduce processing resources, and reduce network power consumption.

Techniques described herein may enable the UE 115-*b* to perform CBG-based uplink communications associated with one codeword, multiple codewords, or both. In particular, techniques described herein may enable the UE 115-*b* to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system.

Figure 4:
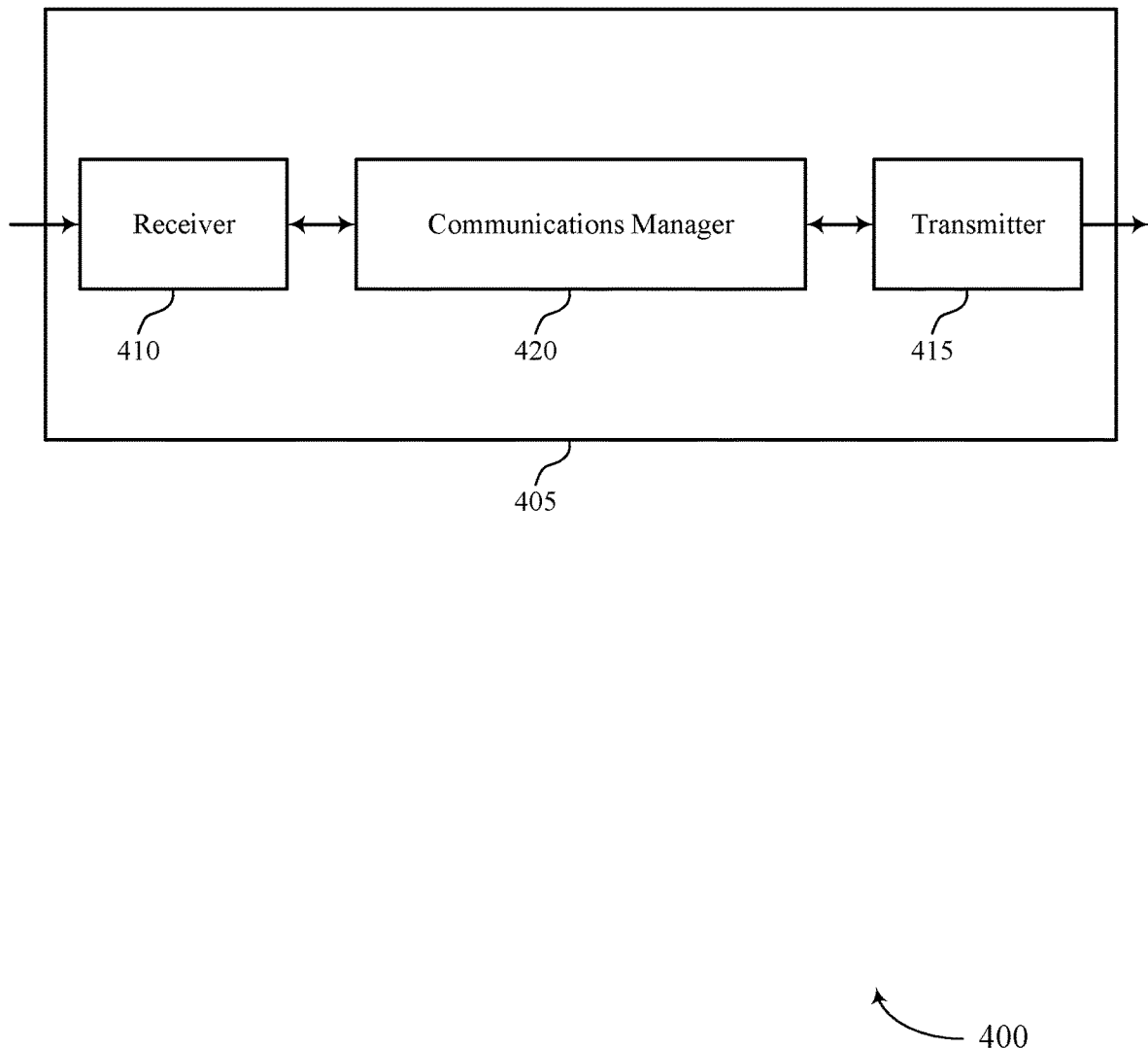
FIGS. 4 and 5 show block diagrams of devices that support techniques for CBG-based transmissions including multiple codewords in accordance with one or more aspects of the present disclosure.

FIG. 4 shows a block diagram 400 of a device 405 that supports techniques for CBG-based transmissions including multiple codewords in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for CBG-based transmissions including multiple codewords). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for CBG-based transmissions including multiple codewords). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for CBG-based transmissions including multiple codewords as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

For example, the communications manager 420 may be configured as or otherwise support a means for receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The communications manager 420 may be configured as or otherwise support a means for receiving, from the network entity, a second control message scheduling an uplink message including a set of multiple CBGs, where the uplink message is associated with a first codeword, a second codeword, or both. The communications manager 420 may be configured as or otherwise support a means for transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

By including or configuring the communications manager 420 in accordance with examples as described herein, the device 405 (e.g., a processor controlling or otherwise coupled with the receiver 410, the transmitter 415, the communications manager 420, or a combination thereof) may enable UEs 115 to perform CBG-based uplink communications associated with one codeword, multiple codewords, or both. In particular, techniques described herein may enable UEs 115 to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system.

Figure 5:
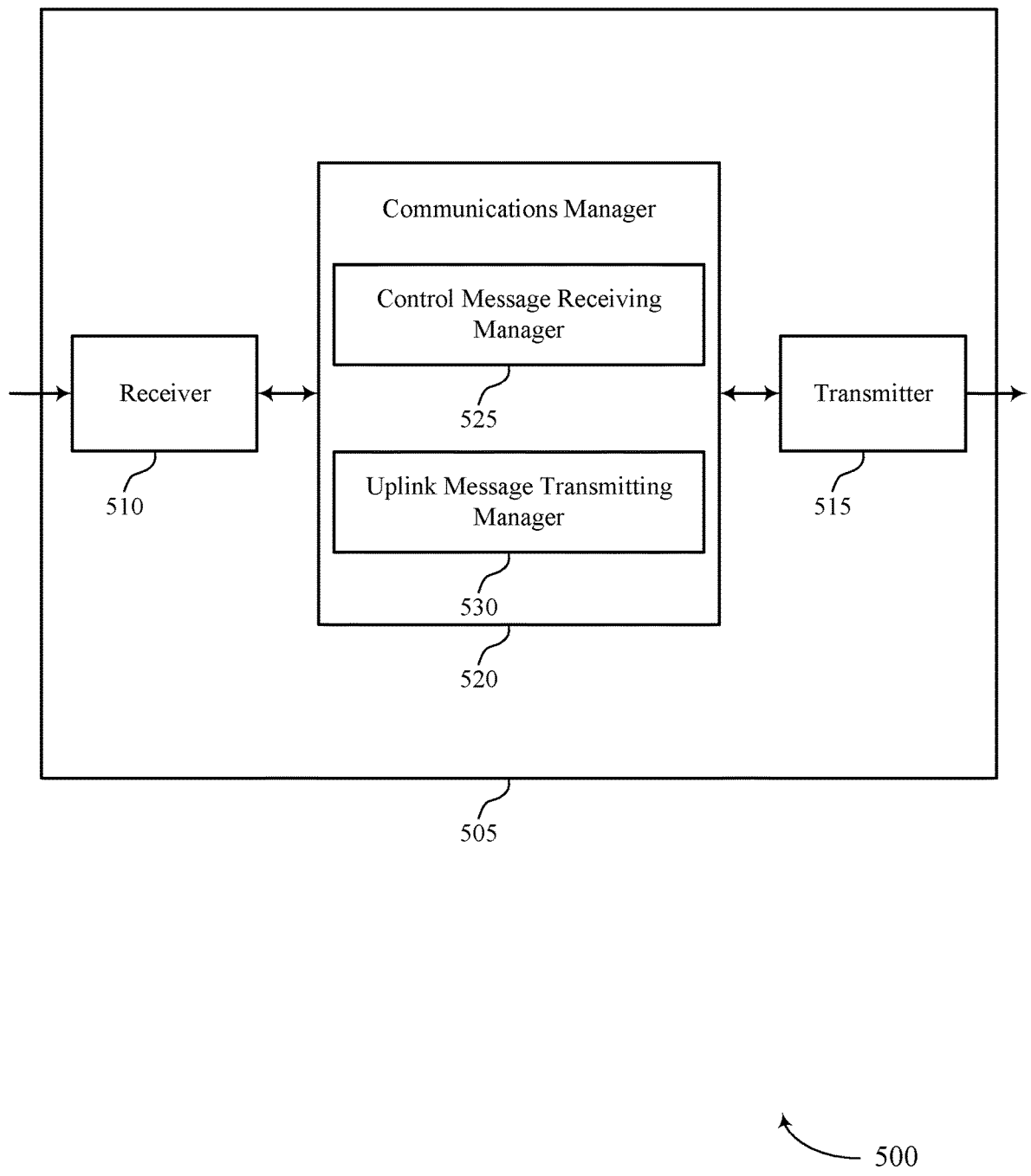

FIG. 5 shows a block diagram 500 of a device 505 that supports techniques for CBG-based transmissions including multiple codewords in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for CBG-based transmissions including multiple codewords). Information may be passed on to other components of the device 505. The receiver 510 may utilize a single antenna or a set of multiple antennas.

The transmitter 515 may provide a means for transmitting signals generated by other components of the device 505.

For example, the transmitter 515 may transmit information such as packets, user data, control information, or any combination thereof associated with various information channels (e.g., control channels, data channels, information channels related to techniques for CBG-based transmissions including multiple codewords). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for CBG-based transmissions including multiple codewords as described herein. For example, the communications manager 520 may include a control message receiving manager 525 an uplink message transmitting manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The control message receiving manager 525 may be configured as or otherwise support a means for receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The control message receiving manager 525 may be configured as or otherwise support a means for receiving, from the network entity, a second control message scheduling an uplink message including a set of multiple CBGs, where the uplink message is associated with a first codeword, a second codeword, or both. The uplink message transmitting manager 530 may be configured as or otherwise support a means for transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Figure 6:
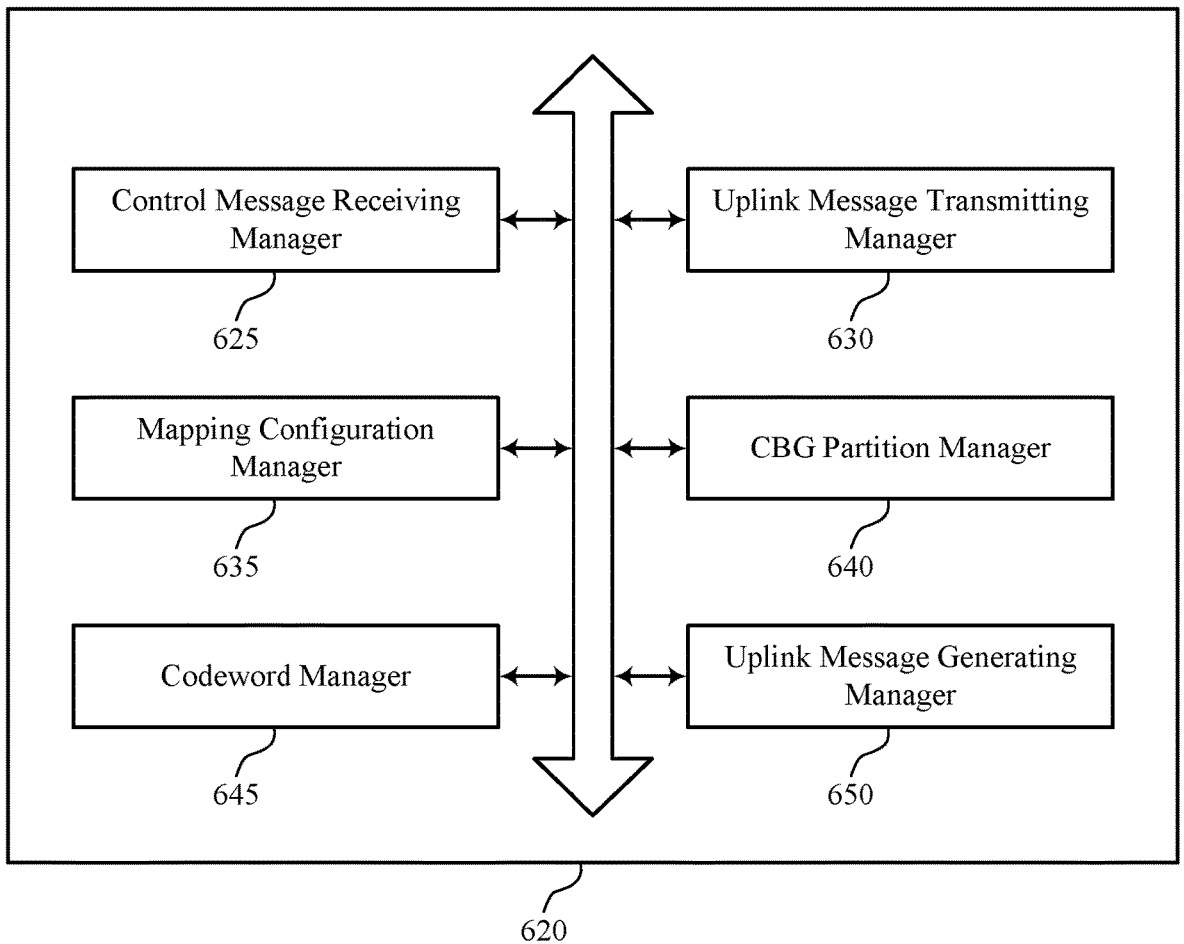
FIG. 6 shows a block diagram of a communications manager that supports techniques for CBG-based transmissions including multiple codewords in accordance with one or more aspects of the present disclosure.

FIG. 6 shows a block diagram 600 of a communications manager 620 that supports techniques for CBG-based transmissions including multiple codewords in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for CBG-based transmissions including multiple codewords as described herein. For example, the communications manager 620 may include a control message receiving manager 625, an uplink message transmitting manager 630, a mapping configuration manager 635, a CBG partition manager 640, a codeword manager 645, an uplink message generating manager 650, or any combination thereof. Each of these components may communicate, directly or indirectly, with one another (e.g., via one or more buses).

The control message receiving manager 625 may be configured as or otherwise support a means for receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. In some examples, the control message receiving manager 625 may be configured as or otherwise support a means for receiving, from the network entity, a second control message scheduling an uplink message including a set of multiple CBGs, where the uplink message is associated with a first codeword, a second codeword, or both. The uplink message transmitting manager 630 may be configured as or otherwise support a means for transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

In some examples, the mapping configuration manager 635 may be configured as or otherwise support a means for receiving, via the first control message, a set of multiple mapping configurations associated with uplink communications including a set of multiple codewords, the set of multiple mapping configurations including the second mapping configuration. In some examples, the mapping configuration manager 635 may be configured as or otherwise support a means for receiving, via the second control message, an indication of the second mapping configuration from the set of multiple mapping configurations, where the set of multiple CBGs of the uplink message are mapped to the first codeword and the second codeword in accordance with the second mapping configuration based on the indication in the second control message.

In some examples, the CBG partition manager 640 may be configured as or otherwise support a means for receiving, via the first control message, the second control message, or both, an indication of a partition of the set of multiple CBGs associated with the second mapping configuration, where the set of multiple CBGs of the uplink message are mapped to the first codeword and the second codeword in accordance with the second mapping configuration and the partition.

In some examples, the partition divides the set of multiple CBGs into a first subset including a first quantity of CBGs and a second subset including a second quantity of CBGs. In some examples, the partition is based on one or more parameters associated with the first codeword, the second codeword or both, the one or more parameters including a priority, a transport block size, or both.

In some examples, the control message receiving manager 625 may be configured as or otherwise support a means for receiving, via the second control message, one or more bit field values associated with a set of multiple CBG transmission information fields, where the set of multiple CBG transmission information fields correspond to the set of multiple CBGs, and where the set of multiple CBGs are mapped to the first codeword, the second codeword, or both, in accordance with the first mapping configuration or the second mapping configuration based on the one or more bit field values.

In some examples, the codeword manager 645 may be configured as or otherwise support a means for identifying whether the uplink message is associated with the first codeword, the second codeword, or both, based on one or more bit fields within the second control message, the one or more bit fields including an MCS field, an RV field, or both. In some examples, the uplink message generating manager 650 may be configured as or otherwise support a means for generating the uplink message in accordance with the first mapping configuration or the second mapping configuration based on the identifying.

In some examples, the uplink message is associated with the first codeword. In some examples, the first codeword is mapped to each CBG of the set of multiple CBGs in accordance with the first mapping configuration.

In some examples, the uplink message is associated with both the first codeword and the second codeword. In some examples, the first codeword is mapped to a first subset of the set of multiple CBGs and the second codeword mapped to a second subset of the set of multiple CBGs in accordance with the second mapping configuration. In some examples, the first subset is different from the second subset.

In some examples, the first subset is associated with a first quantity of CBGs and the second subset is associated with a second quantity of CBGs that is equal to the first quantity of CBGs. In some examples, the first subset is associated with a first quantity of CBGs and the second subset is associated with a second quantity of CBGs that is different from the first quantity of CBGs. In some examples, the first control message includes an RRC message. In some examples, the second control message includes a DCI message, a MAC-CE message, or both.

Figure 7:
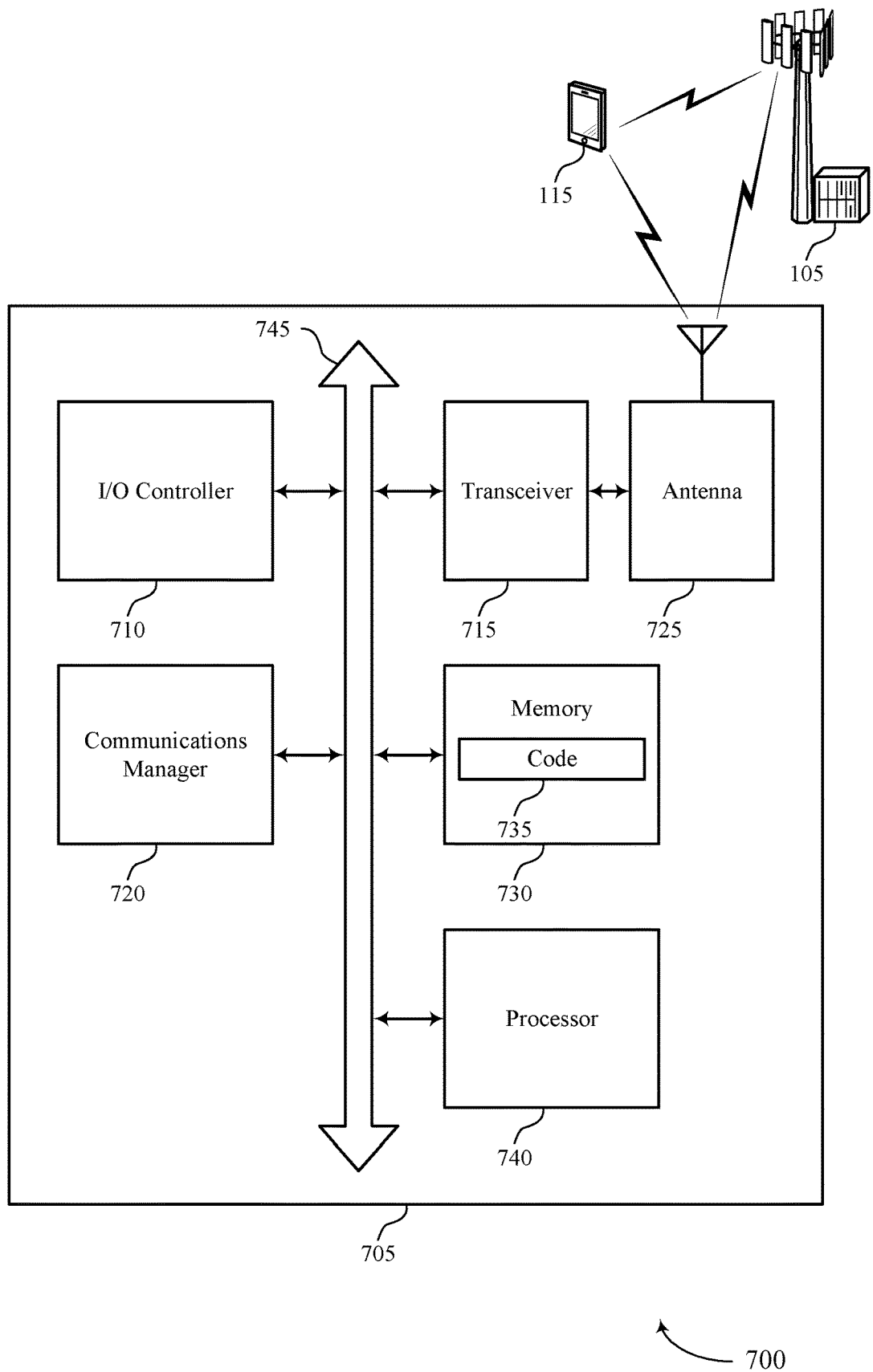
FIG. 7 shows a diagram of a system including a device that supports techniques for CBG-based transmissions including multiple codewords in accordance with one or more aspects of the present disclosure.

FIG. 7 shows a diagram of a system 700 including a device 705 that supports techniques for CBG-based transmissions including multiple codewords in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for CBG-based transmissions including multiple codewords). For example, the device 705 or a component of the device 705 may include a processor 740 and memory 730 coupled with or to the processor 740, the processor 740 and memory 730 configured to perform various functions described herein.

For example, the communications manager 720 may be configured as or otherwise support a means for receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The communications manager 720 may be configured as or otherwise support a means for receiving, from the network entity, a second control message scheduling an uplink message including a set of multiple CBGs, where the uplink message is associated with a first codeword, a second codeword, or both. The communications manager 720 may be configured as or otherwise support a means for transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

By including or configuring the communications manager 720 in accordance with examples as described herein, the device 705 may enable UEs 115 to perform CBG-based uplink communications associated with one codeword, multiple codewords, or both. In particular, techniques described herein may enable UEs 115 to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for CBG-based transmissions including multiple codewords as described herein, or the processor 740 and the memory 730 may be otherwise configured to perform or support such operations.

Figure 8:
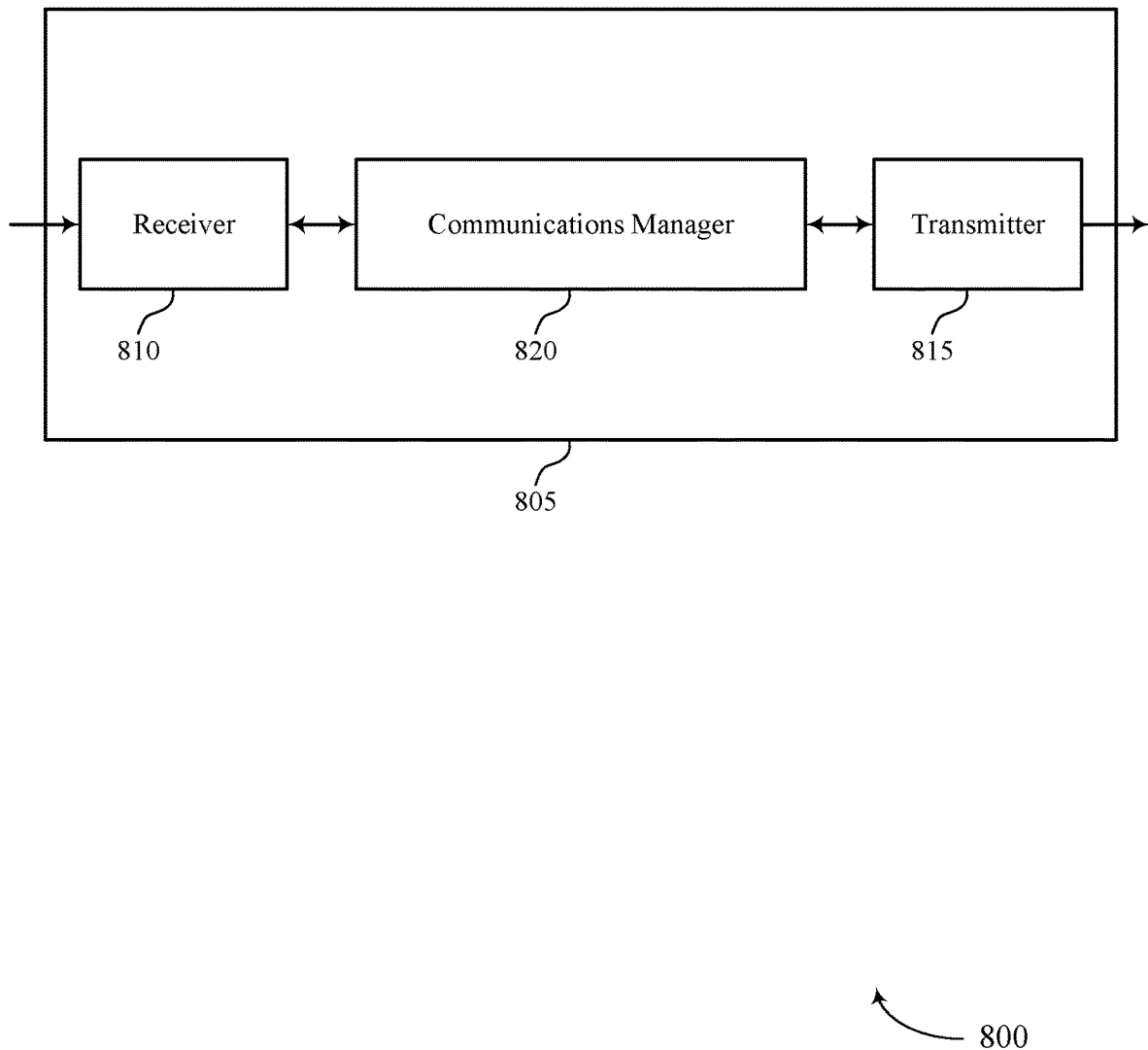
FIGS. 8 and 9 show block diagrams of devices that support techniques for CBG-based transmissions including multiple codewords in accordance with one or more aspects of the present disclosure.

FIG. 8 shows a block diagram 800 of a device 805 that supports techniques for CBG-based transmissions including multiple codewords in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for CBG-based transmissions including multiple codewords as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The communications manager 820 may be configured as or otherwise support a means for outputting a second control message scheduling an uplink message including a set of multiple CBGs, where the uplink message is associated with a first codeword, a second codeword, or both. The communications manager 820 may be configured as or otherwise support a means for obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

By including or configuring the communications manager 820 in accordance with examples as described herein, the device 805 (e.g., a processor controlling or otherwise coupled with the receiver 810, the transmitter 815, the communications manager 820, or a combination thereof) may enable UEs 115 to perform CBG-based uplink communications associated with one codeword, multiple codewords, or both. In particular, techniques described herein may enable UEs 115 to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system.

Figure 9:
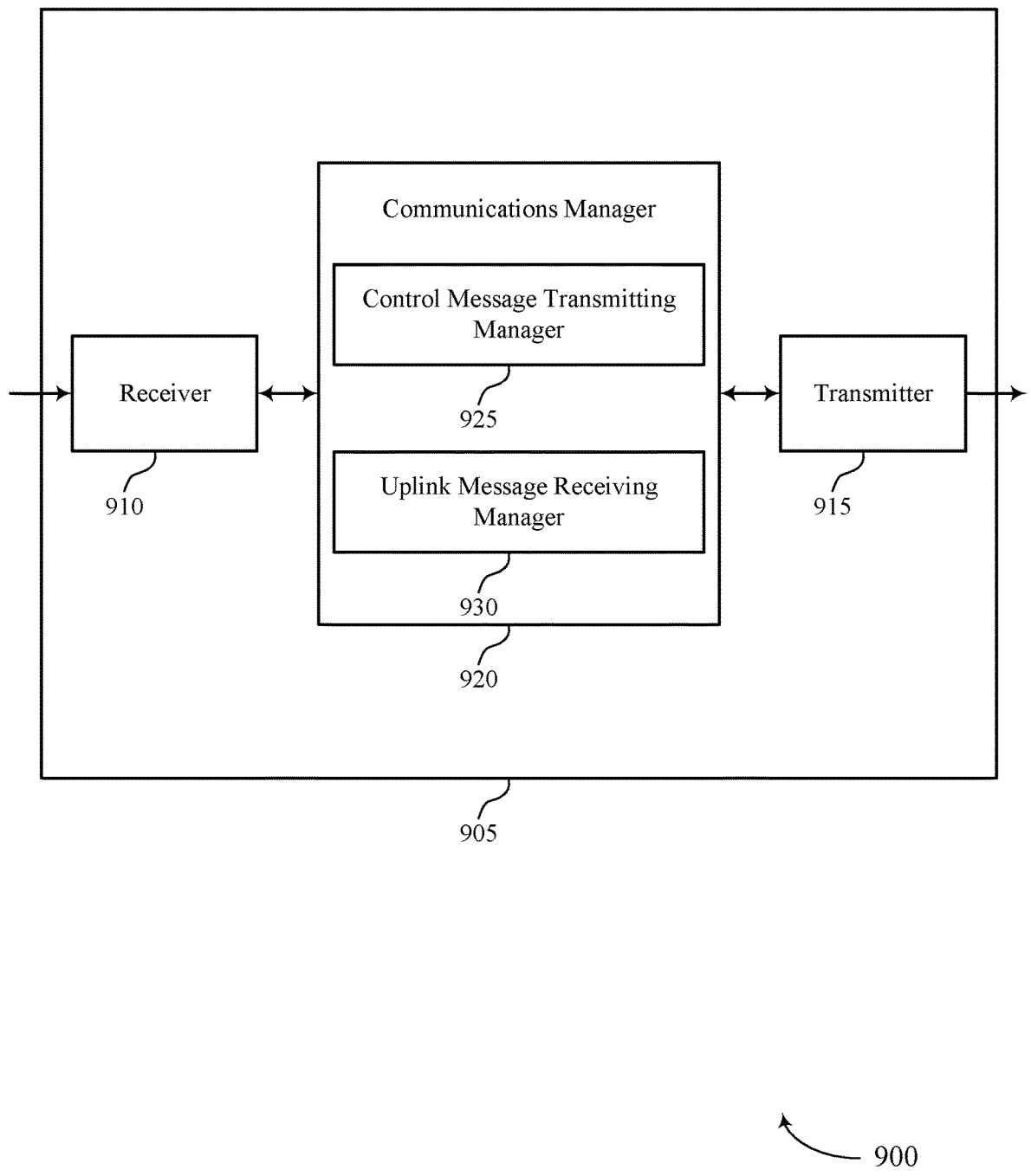

FIG. 9 shows a block diagram 900 of a device 905 that supports techniques for CBG-based transmissions including multiple codewords in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for CBG-based transmissions including multiple codewords as described herein. For example, the communications manager 920 may include a control message transmitting manager 925 an uplink message receiving manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The control message transmitting manager 925 may be configured as or otherwise support a means for outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The control message transmitting manager 925 may be configured as or otherwise support a means for outputting a second control message scheduling an uplink message including a set of multiple CBGs, where the uplink message is associated with a first codeword, a second codeword, or both. The uplink message receiving manager 930 may be configured as or otherwise support a means for obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

Figure 10:
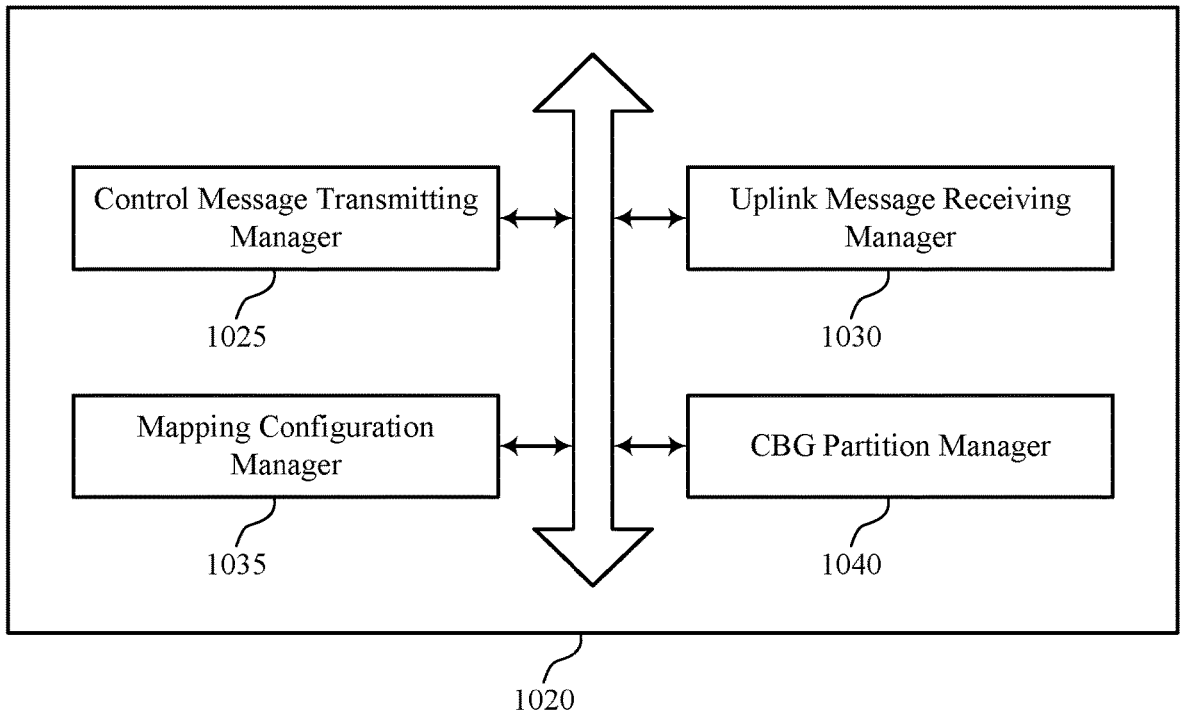
FIG. 10 shows a block diagram of a communications manager that supports techniques for CBG-based transmissions including multiple codewords in accordance with one or more aspects of the present disclosure.

FIG. 10 shows a block diagram 1000 of a communications manager 1020 that supports techniques for CBG-based transmissions including multiple codewords in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for CBG-based transmissions including multiple codewords as described herein. For example, the communications manager 1020 may include a control message transmitting manager 1025, an uplink message receiving manager 1030, a mapping configuration manager 1035, a CBG partition manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The control message transmitting manager 1025 may be configured as or otherwise support a means for outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. In some examples, the control message transmitting manager 1025 may be configured as or otherwise support a means for outputting a second control message scheduling an uplink message including a set of multiple CBGs, where the uplink message is associated with a first codeword, a second codeword, or both. The uplink message receiving manager 1030 may be configured as or otherwise support a means for obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

In some examples, the mapping configuration manager 1035 may be configured as or otherwise support a means for outputting, via the first control message, a set of multiple mapping configurations associated with uplink communications including a set of multiple codewords, the set of multiple mapping configurations including the second mapping configuration. In some examples, the mapping configuration manager 1035 may be configured as or otherwise support a means for outputting, via the second control message, an indication of the second mapping configuration from the set of multiple mapping configurations, where the set of multiple CBGs of the uplink message are mapped to the first codeword and the second codeword in accordance with the second mapping configuration based on the indication in the second control message.

In some examples, the CBG partition manager 1040 may be configured as or otherwise support a means for outputting, via the first control message, the second control message, or both, an indication of a partition of the set of multiple CBGs associated with the second mapping configuration, where the set of multiple CBGs of the uplink message are mapped to the first codeword and the second codeword in accordance with the second mapping configuration and the partition.

In some examples, the partition divides the set of multiple CBGs into a first subset including a first quantity of CBGs and a second subset including a second quantity of CBGs. In some examples, the partition is based on one or more parameters associated with the first codeword, the second codeword or both, the one or more parameters including a priority, a transport block size, or both.

In some examples, the control message transmitting manager 1025 may be configured as or otherwise support a means for outputting, via the second control message, one or more bit field values associated with a set of multiple CBG transmission information fields, where the set of multiple CBG transmission information fields correspond to the set of multiple CBGs, and where the set of multiple CBGs are mapped to the first codeword, the second codeword, or both, in accordance with the first mapping configuration or the second mapping configuration based on the one or more bit field values.

In some examples, the uplink message is associated with the first codeword. In some examples, the first codeword is mapped to each CBG of the set of multiple CBGs in accordance with the first mapping configuration. In some examples, the uplink message is associated with both the first codeword and the second codeword. In some examples, the first codeword is mapped to a first subset of the set of multiple CBGs and the second codeword mapped to a second subset of the set of multiple CBGs in accordance with the second mapping configuration. In some examples, the first subset is different from the second subset.

In some examples, the first subset is associated with a first quantity of CBGs and the second subset is associated with a second quantity of CBGs that is equal to the first quantity of CBGs. In some examples, the first subset is associated with a first quantity of CBGs and the second subset is associated with a second quantity of CBGs that is different from the first quantity of CBGs. In some examples, the first control message includes an RRC message. In some examples, the second control message includes a DCI message, a MAC-CE message, or both.

Figure 11:
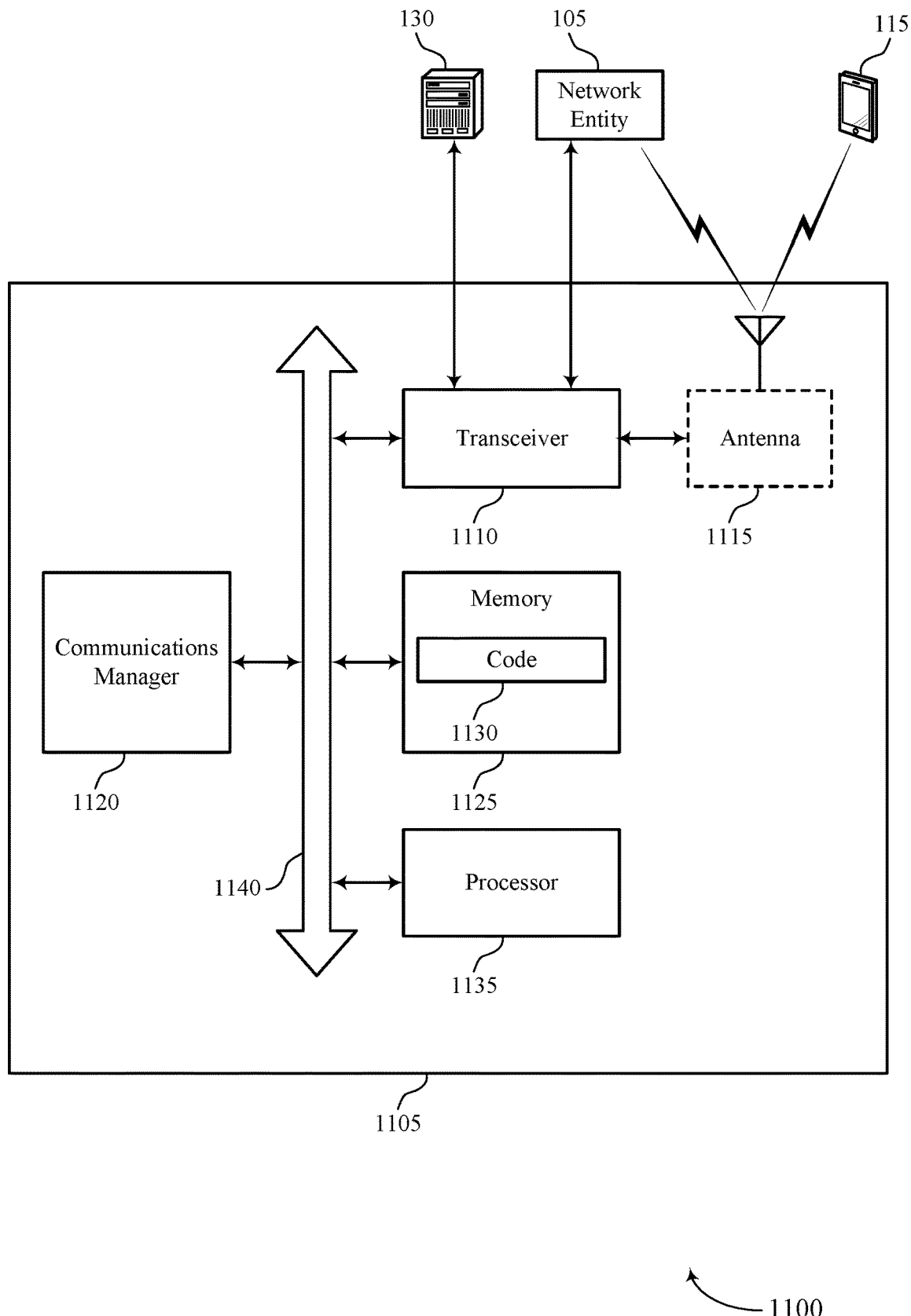
FIG. 11 shows a diagram of a system including a device that supports techniques for CBG-based transmissions including multiple codewords in accordance with one or more aspects of the present disclosure.

FIG. 11 shows a diagram of a system 1100 including a device 1105 that supports techniques for CBG-based transmissions including multiple codewords in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for CBG-based transmissions including multiple codewords). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

For example, the communications manager 1120 may be configured as or otherwise support a means for outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The communications manager 1120 may be configured as or otherwise support a means for outputting a second control message scheduling an uplink message including a set of multiple CBGs, where the uplink message is associated with a first codeword, a second codeword, or both. The communications manager 1120 may be configured as or otherwise support a means for obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration.

By including or configuring the communications manager 1120 in accordance with examples as described herein, the device 1105 may enable UEs 115 to perform CBG-based uplink communications associated with one codeword, multiple codewords, or both. In particular, techniques described herein may enable UEs 115 to be scheduled to perform CBG-based uplink messages including one or multiple codewords, and map the CBGs of the uplink messages in accordance with different mapping configurations based on whether the uplink message is associated with one codeword or multiple codewords. As such, techniques described herein may enable the network to schedule multi-codeword CBG-based uplink communications, thereby preventing the need for the network to schedule separate uplink messages for separate codewords. As such, aspects of the present disclosure may enable more efficient uplink scheduling, and reduce network traffic within the wireless communications system.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for CBG-based transmissions including multiple codewords as described herein, or the processor 1135 and the memory 1125 may be otherwise configured to perform or support such operations.

Figure 12:
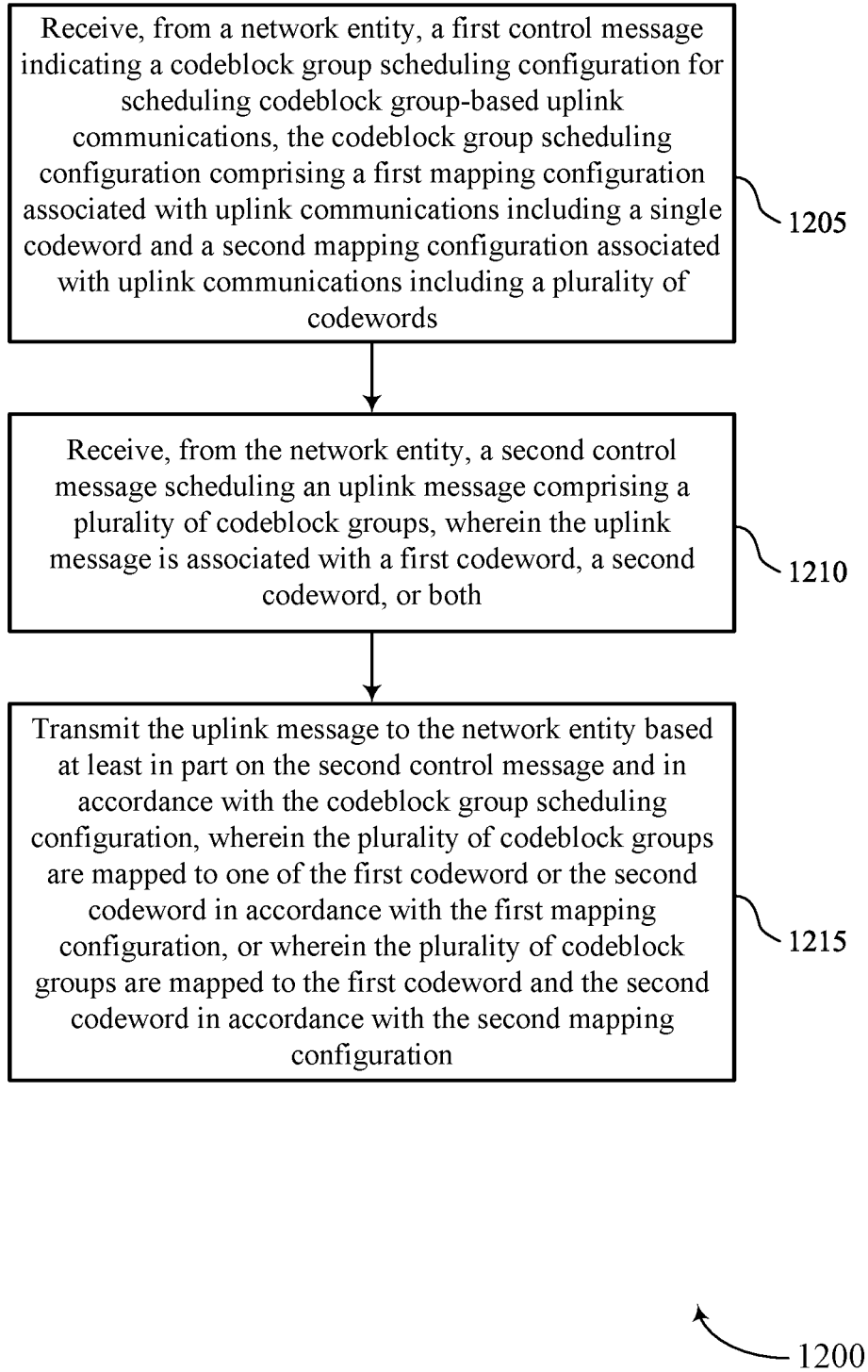
FIGS. 12 through 15 show flowcharts illustrating methods that support techniques for CBG-based transmissions including multiple codewords in accordance with one or more aspects of the present disclosure.

FIG. 12 shows a flowchart illustrating a method 1200 that supports techniques for CBG-based transmissions including multiple codewords in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The operations of 1205 may be performed in accordance with examples as disclosed herein. In some examples, aspects of the operations of 1205 may be performed by a control message receiving manager 625 as described with reference to FIG. 6.

At 1210, the method may include receiving, from the network entity, a second control message scheduling an uplink message including a set of multiple CBGs, where the uplink message is associated with a first codeword, a second codeword, or both. The operations of 1210 may be performed in accordance with examples as disclosed herein. In some examples, aspects of the operations of 1210 may be performed by a control message receiving manager 625 as described with reference to FIG. 6.

At 1215, the method may include transmitting the uplink message to the network entity based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration. The operations of 1215 may be performed in accordance with examples as disclosed herein. In some examples, aspects of the operations of 1215 may be performed by an uplink message transmitting manager 630 as described with reference to FIG. 6.

Figure 13:
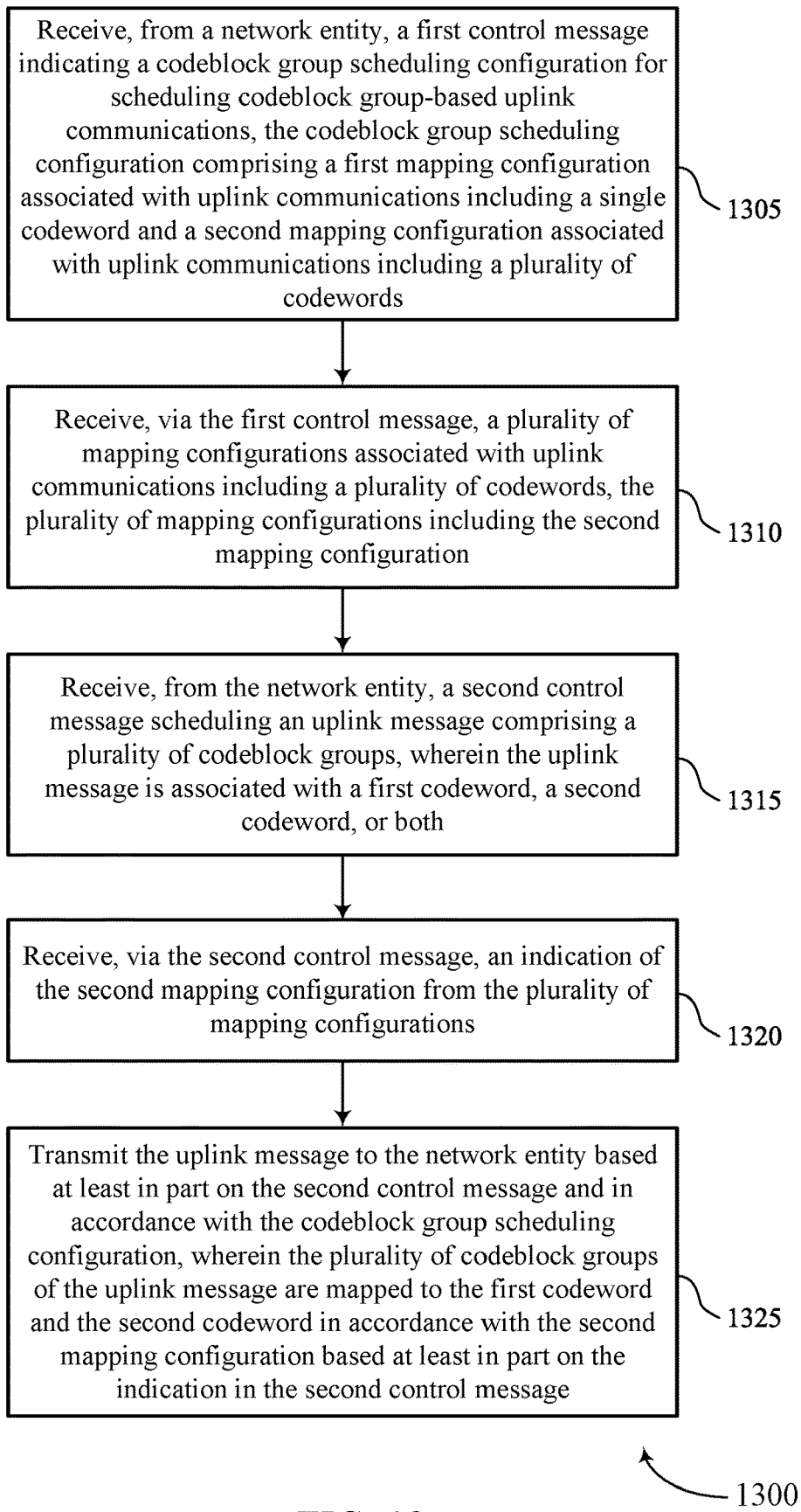

FIG. 13 shows a flowchart illustrating a method 1300 that supports techniques for CBG-based transmissions including multiple codewords in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The operations of 1305 may be performed in accordance with examples as disclosed herein. In some examples, aspects of the operations of 1305 may be performed by a control message receiving manager 625 as described with reference to FIG. 6.

At 1310, the method may include receiving, via the first control message, a set of multiple mapping configurations associated with uplink communications including a set of multiple codewords, the set of multiple mapping configurations including the second mapping configuration. The operations of 1310 may be performed in accordance with examples as disclosed herein. In some examples, aspects of the operations of 1310 may be performed by a mapping configuration manager 635 as described with reference to FIG. 6.

At 1315, the method may include receiving, from the network entity, a second control message scheduling an uplink message including a set of multiple CBGs, where the uplink message is associated with a first codeword, a second codeword, or both. The operations of 1315 may be performed in accordance with examples as disclosed herein. In some examples, aspects of the operations of 1315 may be performed by a control message receiving manager 625 as described with reference to FIG. 6.

At 1320, the method may include receiving, via the second control message, an indication of the second mapping configuration from the set of multiple mapping configurations. The operations of 1320 may be performed in accordance with examples as disclosed herein. In some examples, aspects of the operations of 1320 may be performed by a mapping configuration manager 635 as described with reference to FIG. 6.

At 1325, the method may include transmitting the uplink message to the network entity based on the second control message and in accordance with the CBG scheduling configuration, where the set of multiple CBGs of the uplink message are mapped to the first codeword and the second codeword in accordance with the second mapping configuration based on the indication in the second control message. The operations of 1325 may be performed in accordance with examples as disclosed herein. In some examples, aspects of the operations of 1325 may be performed by an uplink message transmitting manager 630 as described with reference to FIG. 6.

Figure 14:
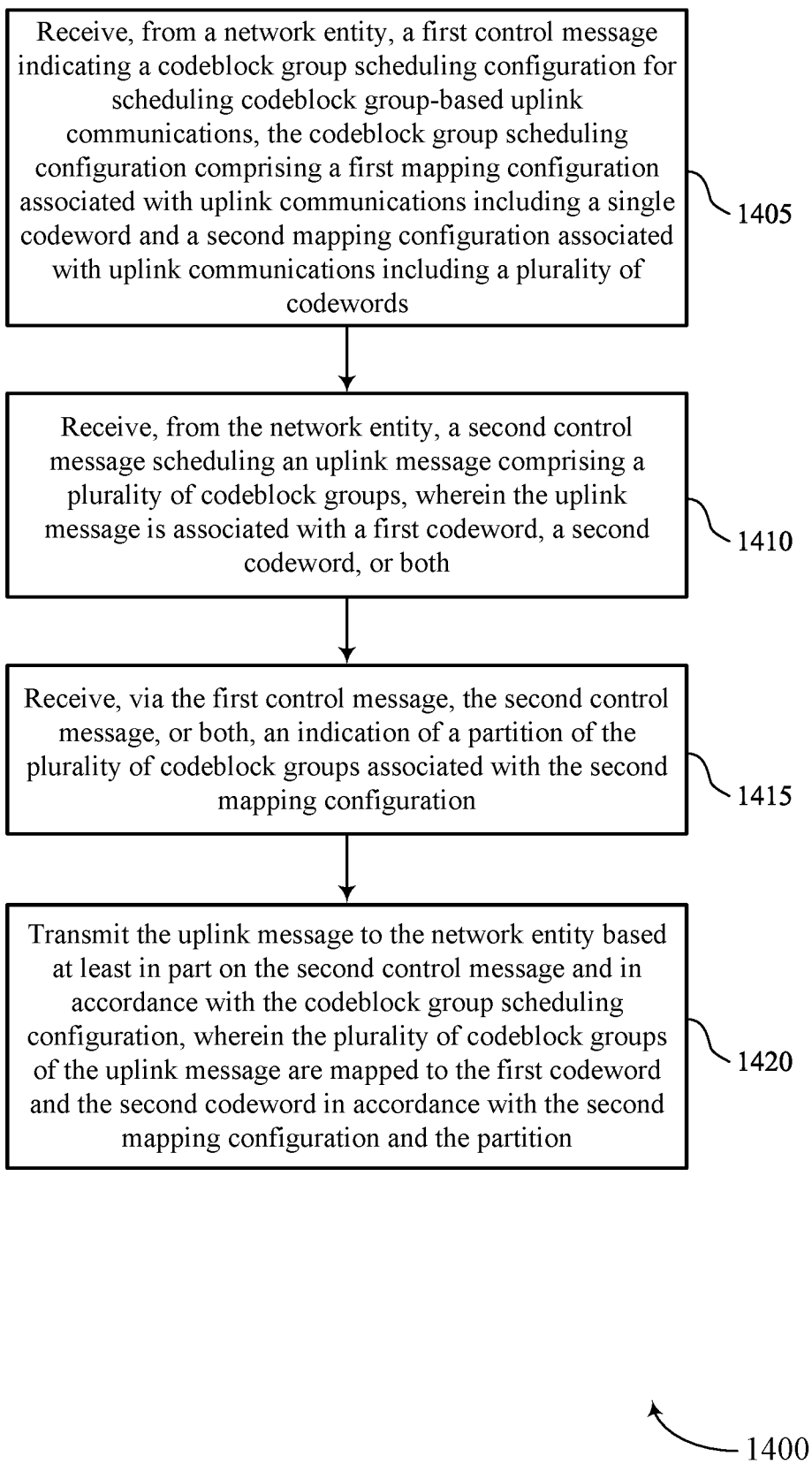

FIG. 14 shows a flowchart illustrating a method 1400 that supports techniques for CBG-based transmissions including multiple codewords in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The operations of 1405 may be performed in accordance with examples as disclosed herein. In some examples, aspects of the operations of 1405 may be performed by a control message receiving manager 625 as described with reference to FIG. 6.

At 1410, the method may include receiving, from the network entity, a second control message scheduling an uplink message including a set of multiple CBGs, where the uplink message is associated with a first codeword, a second codeword, or both. The operations of 1410 may be performed in accordance with examples as disclosed herein. In some examples, aspects of the operations of 1410 may be performed by a control message receiving manager 625 as described with reference to FIG. 6.

At 1415, the method may include receiving, via the first control message, the second control message, or both, an indication of a partition of the set of multiple CBGs associated with the second mapping configuration. The operations of 1415 may be performed in accordance with examples as disclosed herein. In some examples, aspects of the operations of 1415 may be performed by a CBG partition manager 640 as described with reference to FIG. 6.

At 1420, the method may include transmitting the uplink message to the network entity based on the second control message and in accordance with the CBG scheduling configuration, where the set of multiple CBGs of the uplink message are mapped to the first codeword and the second codeword in accordance with the second mapping configuration and the partition. The operations of 1420 may be performed in accordance with examples as disclosed herein. In some examples, aspects of the operations of 1420 may be performed by an uplink message transmitting manager 630 as described with reference to FIG. 6.

Figure 15:
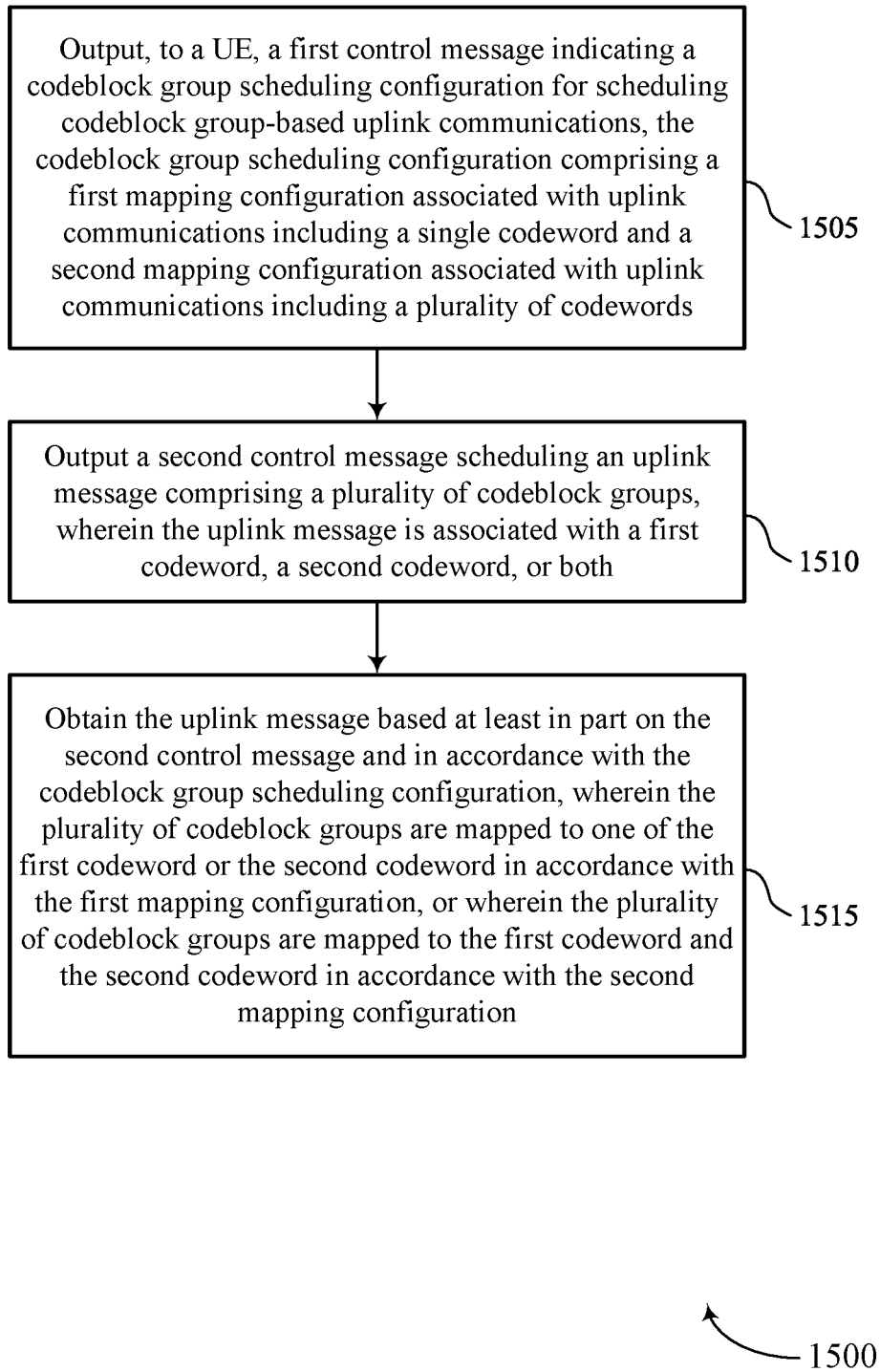

FIG. 15 shows a flowchart illustrating a method 1500 that supports techniques for CBG-based transmissions including multiple codewords in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include outputting, to a UE, a first control message indicating a CBG scheduling configuration for scheduling CBG-based uplink communications, the CBG scheduling configuration including a first mapping configuration associated with uplink communications including a single codeword and a second mapping configuration associated with uplink communications including a set of multiple codewords. The operations of 1505 may be performed in accordance with examples as disclosed herein. In some examples, aspects of the operations of 1505 may be performed by a control message transmitting manager 1025 as described with reference to FIG. 10.

At 1510, the method may include outputting a second control message scheduling an uplink message including a set of multiple CBGs, where the uplink message is associated with a first codeword, a second codeword, or both. The operations of 1510 may be performed in accordance with examples as disclosed herein. In some examples, aspects of the operations of 1510 may be performed by a control message transmitting manager 1025 as described with reference to FIG. 10.

At 1515, the method may include obtaining the uplink message based on the second control message and in accordance with the CBG scheduling configuration, where the set of multiple CBGs are mapped to one of the first codeword or the second codeword in accordance with the first mapping configuration, or where the set of multiple CBGs are mapped to the first codeword and the second codeword in accordance with the second mapping configuration. The operations of 1515 may be performed in accordance with examples as disclosed herein. In some examples, aspects of the operations of 1515 may be performed by an uplink message receiving manager 1030 as described with reference to FIG. 10.

The following provides an overview of aspects of the present disclosure:

Aspect 1: A method for wireless communication at a UE, comprising: receiving, from a network entity, a first control message indicating a CBG scheduling configuration for scheduling CBG-based uplink communications, the CBG scheduling configuration comprising a first mapping configuration associated with uplink communications including a single codeword and a second mapping configuration associated with uplink communications including a plurality of codewords; receiving, from the network entity, a second control message scheduling an uplink message comprising a plurality of CBGs, wherein the second control message is associated with a first codeword, a second codeword, or both; and transmitting the uplink message to the network entity based at least in part on the second control message and in accordance with the CBG scheduling configuration, wherein the plurality of CBGs are mapped to one of the first codeword or the second codeword in accordance with the first mapping configuration, or wherein the plurality of CBGs are mapped to the first codeword and the second codeword in accordance with the second mapping configuration.

Aspect 2: The method of aspect 1, further comprising: receiving, via the first control message, a plurality of mapping configurations associated with uplink communications including a plurality of codewords, the plurality of mapping configurations including the second mapping configuration; and receiving, via the second control message, an indication of the second mapping configuration from the plurality of mapping configurations, wherein the plurality of CBGs of the uplink message are mapped to the first codeword and the second codeword in accordance with the second mapping configuration based at least in part on the indication in the second control message.

Aspect 3: The method of any of aspects 1 through 2, further comprising: receiving, via the first control message, the second control message, or both, an indication of a partition of the plurality of CBGs associated with the second mapping configuration, wherein the plurality of CBGs of the uplink message are mapped to the first codeword and the second codeword in accordance with the second mapping configuration and the partition.

Aspect 4: The method of aspect 3, wherein the partition divides the plurality of CBGs into a first subset including a first quantity of CBGs and a second subset including a second quantity of CBGs, the partition is based on one or more parameters associated with the first codeword, the second codeword or both, the one or more parameters comprising a priority, a transport block size, or both.

Aspect 5: The method of any of aspects 1 through 4, further comprising: receiving, via the second control message, one or more bit field values associated with a plurality of CBG transmission information fields, wherein the plurality of CBG transmission information fields correspond to the plurality of CBGs, and wherein the plurality of CBGs are mapped to the first codeword, the second codeword, or both, in accordance with the first mapping configuration or the second mapping configuration based at least in part on the one or more bit field values.

Aspect 6: The method of any of aspects 1 through 5, further comprising: identifying whether the uplink message is associated with the first codeword, the second codeword, or both, based at least in part on one or more bit fields within the second control message, the one or more bit fields comprising a MCS field, an RV field, or both; and generating the uplink message in accordance with the first mapping configuration or the second mapping configuration based at least in part on the identifying.

Aspect 7: The method of any of aspects 1 through 6, wherein the uplink message is associated with the first codeword, the first codeword is mapped to each CBG of the plurality of CBGs in accordance with the first mapping configuration.

Aspect 8: The method of any of aspects 1 through 7, wherein the uplink message is associated with both the first codeword and the second codeword, the first codeword is mapped to a first subset of the plurality of CBGs and the second codeword mapped to a second subset of the plurality of CBGs in accordance with the second mapping configuration, the first subset is different from the second subset.

Aspect 9: The method of aspect 8, wherein the first subset is associated with a first quantity of CBGs and the second subset is associated with a second quantity of CBGs that is equal to the first quantity of CBGs.

Aspect 10: The method of any of aspects 8 through 9, wherein the first subset is associated with a first quantity of CBGs and the second subset is associated with a second quantity of CBGs that is different from the first quantity of CBGs.

Aspect 11: The method of any of aspects 1 through 10, wherein the first control message comprises an RRC message, and the second control message comprises a DCI message, a MAC-CE message, or both.

Aspect 12: A method for wireless communication at a network entity, comprising: outputting, to a UE, a first control message indicating a CBG scheduling configuration for scheduling CBG-based uplink communications, the CBG scheduling configuration comprising a first mapping configuration associated with uplink communications including a single codeword and a second mapping configuration associated with uplink communications including a plurality of codewords; outputting a second control message scheduling an uplink message comprising a plurality of CBGs, wherein the second control message is associated with a first codeword, a second codeword, or both; and obtaining the uplink message based at least in part on the second control message and in accordance with the CBG scheduling configuration, wherein the plurality of CBGs are mapped to one of the first codeword or the second codeword in accordance with the first mapping configuration, or wherein the plurality of CBGs are mapped to the first codeword and the second codeword in accordance with the second mapping configuration.

Aspect 13: The method of aspect 12, further comprising: outputting, via the first control message, a plurality of mapping configurations associated with uplink communications including a plurality of codewords, the plurality of mapping configurations including the second mapping configuration; and outputting, via the second control message, an indication of the second mapping configuration from the plurality of mapping configurations, wherein the plurality of CBGs of the uplink message are mapped to the first codeword and the second codeword in accordance with the second mapping configuration based at least in part on the indication in the second control message.

Aspect 14: The method of any of aspects 12 through 13, further comprising: outputting, via the first control message, the second control message, or both, an indication of a partition of the plurality of CBGs associated with the second mapping configuration, wherein the plurality of CBGs of the uplink message are mapped to the first codeword and the second codeword in accordance with the second mapping configuration and the partition.

Aspect 15: The method of aspect 14, wherein the partition divides the plurality of CBGs into a first subset including a first quantity of CBGs and a second subset including a second quantity of CBGs, the partition is based on one or more parameters associated with the first codeword, the second codeword or both, the one or more parameters comprising a priority, a transport block size, or both.

Aspect 16: The method of any of aspects 12 through 15, further comprising: outputting, via the second control message, one or more bit field values associated with a plurality of CBG transmission information fields, wherein the plurality of CBG transmission information fields correspond to the plurality of CBGs, and wherein the plurality of CBGs are mapped to the first codeword, the second codeword, or both, in accordance with the first mapping configuration or the second mapping configuration based at least in part on the one or more bit field values.

Aspect 17: The method of any of aspects 12 through 16, wherein the uplink message is associated with the first codeword, the first codeword is mapped to each CBG of the plurality of CBGs in accordance with the first mapping configuration.

Aspect 18: The method of any of aspects 12 through 17, wherein the uplink message is associated with both the first codeword and the second codeword, the first codeword is mapped to a first subset of the plurality of CBGs and the second codeword mapped to a second subset of the plurality of CBGs in accordance with the second mapping configuration, the first subset is different from the second subset.

Aspect 19: The method of aspect 18, wherein the first subset is associated with a first quantity of CBGs and the second subset is associated with a second quantity of CBGs that is equal to the first quantity of CBGs.

Aspect 20: The method of any of aspects 18 through 19, wherein the first subset is associated with a first quantity of CBGs and the second subset is associated with a second quantity of CBGs that is different from the first quantity of CBGs.

Aspect 21: The method of any of aspects 12 through 20, wherein the first control message comprises an RRC message, and the second control message comprises a DCI message, a MAC-CE message, or both.

Aspect 22: An apparatus comprising a processor; memory coupled with the processor; and instructions stored in the memory and executable by the processor to cause the apparatus to perform a method of any of aspects 1 through 11.

Aspect 23: An apparatus comprising at least one means for performing a method of any of aspects 1 through 11.

Aspect 24: A non-transitory computer-readable medium storing code the code comprising instructions executable by a processor to perform a method of any of aspects 1 through 11.

Aspect 25: An apparatus comprising a processor; memory coupled with the processor; and instructions stored in the memory and executable by the processor to cause the apparatus to perform a method of any of aspects 12 through 21.

Aspect 26: An apparatus comprising at least one means for performing a method of any of aspects 12 through 21.

Aspect 27: A non-transitory computer-readable medium storing code the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a processor;
   a memory coupled with the processor; and
   instructions stored in the memory and executable by the processor to cause the apparatus to:
      receive, from a network entity, a first control message indicating a codeblock group scheduling configuration for scheduling codeblock group-based uplink communications, the codeblock group scheduling configuration comprising a first mapping configuration associated with uplink communications including a single codeword and a second mapping configuration associated with uplink communications including a plurality of codewords;
      receive, from the network entity, a second control message scheduling an uplink message comprising a plurality of codeblock groups, wherein the uplink message is associated with a first codeword, a second codeword, or both; and
      transmit the uplink message to the network entity based at least in part on the second control message and in accordance with the codeblock group scheduling configuration, wherein the plurality of codeblock groups are mapped to one of the first codeword or the second codeword in accordance with the first mapping configuration, or wherein the plurality of codeblock groups are mapped to the first codeword and the second codeword in accordance with the second mapping configuration.

2. The apparatus of claim 1, wherein the instructions are further executable by the processor to cause the apparatus to:
   receive, via the first control message, a plurality of mapping configurations associated with uplink communications including a plurality of codewords, the plurality of mapping configurations including the second mapping configuration; and
   receive, via the second control message, an indication of the second mapping configuration from the plurality of mapping configurations, wherein the plurality of codeblock groups of the uplink message are mapped to the first codeword and the second codeword in accordance with the second mapping configuration based at least in part on the indication in the second control message.

3. The apparatus of claim 1, wherein the instructions are further executable by the processor to cause the apparatus to:
   receive, via the first control message, the second control message, or both, an indication of a partition of the plurality of codeblock groups associated with the second mapping configuration, wherein the plurality of codeblock groups of the uplink message are mapped to the first codeword and the second codeword in accordance with the second mapping configuration and the partition.

4. The apparatus of claim 3, wherein the partition divides the plurality of codeblock groups into a first subset including a first quantity of codeblock groups and a second subset including a second quantity of codeblock groups, and wherein the partition is based on one or more parameters associated with the first codeword, the second codeword or both, the one or more parameters comprising a priority, a transport block size, or both.

5. The apparatus of claim 1, wherein the instructions are further executable by the processor to cause the apparatus to:
   receive, via the second control message, one or more bit field values associated with a plurality of codeblock group transmission information fields, wherein the plurality of codeblock group transmission information fields correspond to the plurality of codeblock groups, and wherein the plurality of codeblock groups are mapped to the first codeword, the second codeword, or both, in accordance with the first mapping configuration or the second mapping configuration based at least in part on the one or more bit field values.

6. The apparatus of claim 1, wherein the instructions are further executable by the processor to cause the apparatus to:
   identify whether the uplink message is associated with the first codeword, the second codeword, or both, based at least in part on one or more bit fields within the second control message, the one or more bit fields comprising a modulation and coding scheme field, a redundancy version field, or both; and
   generate the uplink message in accordance with the first mapping configuration or the second mapping configuration based at least in part on the identifying.

7. The apparatus of claim 1, wherein the uplink message is associated with the first codeword, and wherein the first codeword is mapped to each codeblock group of the plurality of codeblock groups in accordance with the first mapping configuration.

8. The apparatus of claim 1, wherein the uplink message is associated with both the first codeword and the second codeword, wherein the first codeword is mapped to a first subset of the plurality of codeblock groups and the second codeword mapped to a second subset of the plurality of codeblock groups in accordance with the second mapping configuration, and wherein the first subset is different from the second subset.

9. The apparatus of claim 8, wherein the first subset is associated with a first quantity of codeblock groups and the second subset is associated with a second quantity of codeblock groups that is equal to the first quantity of codeblock groups.

10. The apparatus of claim 8, wherein the first subset is associated with a first quantity of codeblock groups and the second subset is associated with a second quantity of codeblock groups that is different from the first quantity of codeblock groups.

11. The apparatus of claim 1, wherein the first control message comprises a radio resource control message, and wherein the second control message comprises a downlink control information message, a medium access control-control element message, or both.

12. An apparatus, comprising:
    a processor;
    a memory coupled with the processor; and
    instructions stored in the memory and executable by the processor to cause the apparatus to:
       output, to a user equipment (UE), a first control message indicating a codeblock group scheduling configuration for scheduling codeblock group-based uplink communications, the codeblock group scheduling configuration comprising a first mapping configuration associated with uplink communications including a single codeword and a second mapping configuration associated with uplink communications including a plurality of codewords;

output a second control message scheduling an uplink message comprising a plurality of codeblock groups, wherein the uplink message is associated with a first codeword, a second codeword, or both; and obtain the uplink message based at least in part on the second control message and in accordance with the codeblock group scheduling configuration, wherein the plurality of codeblock groups are mapped to one of the first codeword or the second codeword in accordance with the first mapping configuration, or wherein the plurality of codeblock groups are mapped to the first codeword and the second codeword in accordance with the second mapping configuration.

13. The apparatus of claim 12, wherein the instructions are further executable by the processor to cause the apparatus to:

output, via the first control message, a plurality of mapping configurations associated with uplink communications including a plurality of codewords, the plurality of mapping configurations including the second mapping configuration; and output, via the second control message, an indication of the second mapping configuration from the plurality of mapping configurations, wherein the plurality of codeblock groups of the uplink message are mapped to the first codeword and the second codeword in accordance with the second mapping configuration based at least in part on the indication in the second control message.

14. The apparatus of claim 12, wherein the instructions are further executable by the processor to cause the apparatus to:

output, via the first control message, the second control message, or both, an indication of a partition of the plurality of codeblock groups associated with the second mapping configuration, wherein the plurality of codeblock groups of the uplink message are mapped to the first codeword and the second codeword in accordance with the second mapping configuration and the partition.

15. The apparatus of claim 14, wherein the partition divides the plurality of codeblock groups into a first subset including a first quantity of codeblock groups and a second subset including a second quantity of codeblock groups, and wherein the partition is based on one or more parameters associated with the first codeword, the second codeword or both, the one or more parameters comprising a priority, a transport block size, or both.

16. The apparatus of claim 12, wherein the instructions are further executable by the processor to cause the apparatus to:

output, via the second control message, one or more bit field values associated with a plurality of codeblock group transmission information fields, wherein the plurality of codeblock group transmission information fields correspond to the plurality of codeblock groups, and wherein the plurality of codeblock groups are mapped to the first codeword, the second codeword, or both, in accordance with the first mapping configuration or the second mapping configuration based at least in part on the one or more bit field values.

17. The apparatus of claim 12, wherein the uplink message is associated with the first codeword, and wherein the first codeword is mapped to each codeblock group of the plurality of codeblock groups in accordance with the first mapping configuration.

18. The apparatus of claim 12, wherein the uplink message is associated with both the first codeword and the second codeword, wherein the first codeword is mapped to a first subset of the plurality of codeblock groups and the second codeword mapped to a second subset of the plurality of codeblock groups in accordance with the second mapping configuration, and wherein the first subset is different from the second subset.

19. The apparatus of claim 18, wherein the first subset is associated with a first quantity of codeblock groups and the second subset is associated with a second quantity of codeblock groups that is equal to the first quantity of codeblock groups.

20. The apparatus of claim 18, wherein the first subset is associated with a first quantity of codeblock groups and the second subset is associated with a second quantity of codeblock groups that is different from the first quantity of codeblock groups.

21. The apparatus of claim 12, wherein the first control message comprises a radio resource control message, and wherein the second control message comprises a downlink control information message, a medium access control-control element message, or both.

22. A method for wireless communication at a user equipment (UE), comprising:

receiving, from a network entity, a first control message indicating a codeblock group scheduling configuration for scheduling codeblock group-based uplink communications, the codeblock group scheduling configuration comprising a first mapping configuration associated with uplink communications including a single codeword and a second mapping configuration associated with uplink communications including a plurality of codewords;

receiving, from the network entity, a second control message scheduling an uplink message comprising a plurality of codeblock groups, wherein the uplink message is associated with a first codeword, a second codeword, or both; and transmitting the uplink message to the network entity based at least in part on the second control message and in accordance with the codeblock group scheduling configuration, wherein the plurality of codeblock groups are mapped to one of the first codeword or the second codeword in accordance with the first mapping configuration, or wherein the plurality of codeblock groups are mapped to the first codeword and the second codeword in accordance with the second mapping configuration.

23. The method of claim 22, further comprising:

receiving, via the first control message, a plurality of mapping configurations associated with uplink communications including a plurality of codewords, the plurality of mapping configurations including the second mapping configuration; and receiving, via the second control message, an indication of the second mapping configuration from the plurality of mapping configurations, wherein the plurality of codeblock groups of the uplink message are mapped to the first codeword and the second codeword in accordance with the second mapping configuration based at least in part on the indication in the second control message.

24. The method of claim 22, further comprising:
receiving, via the first control message, the second control message, or both, an indication of a partition of the plurality of codeblock groups associated with the second mapping configuration, wherein the plurality of codeblock groups of the uplink message are mapped to the first codeword and the second codeword in accordance with the second mapping configuration and the partition.

25. The method of claim 24, wherein the partition divides the plurality of codeblock groups into a first subset including a first quantity of codeblock groups and a second subset including a second quantity of codeblock groups, and wherein the partition is based on one or more parameters associated with the first codeword, the second codeword or both, the one or more parameters comprising a priority, a transport block size, or both.

26. The method of claim 22, further comprising:
receiving, via the second control message, one or more bit field values associated with a plurality of codeblock group transmission information fields, wherein the plurality of codeblock group transmission information fields correspond to the plurality of codeblock groups, and wherein the plurality of codeblock groups are mapped to the first codeword, the second codeword, or both, in accordance with the first mapping configuration or the second mapping configuration based at least in part on the one or more bit field values.

27. The method of claim 22, wherein the uplink message is associated with both the first codeword and the second codeword, wherein the first codeword is mapped to a first subset of the plurality of codeblock groups and the second codeword mapped to a second subset of the plurality of codeblock groups in accordance with the second mapping configuration, and wherein the first subset is different from the second subset.

28. The method of claim 27, wherein the first subset is associated with a first quantity of codeblock groups and the second subset is associated with a second quantity of codeblock groups that is equal to the first quantity of codeblock groups.

29. A method for wireless communication at a network entity, comprising:
outputting, to a user equipment (UE), a first control message indicating a codeblock group scheduling configuration for scheduling codeblock group-based uplink communications, the codeblock group scheduling configuration comprising a first mapping configuration associated with uplink communications including a single codeword and a second mapping configuration associated with uplink communications including a plurality of codewords;
outputting a second control message scheduling an uplink message comprising a plurality of codeblock groups, wherein the uplink message is associated with a first codeword, a second codeword, or both; and
obtaining the uplink message based at least in part on the second control message and in accordance with the codeblock group scheduling configuration, wherein the plurality of codeblock groups are mapped to one of the first codeword or the second codeword in accordance with the first mapping configuration, or wherein the plurality of codeblock groups are mapped to the first codeword and the second codeword in accordance with the second mapping configuration.

30. The method of claim 29, further comprising:
outputting, via the first control message, a plurality of mapping configurations associated with uplink communications including a plurality of codewords, the plurality of mapping configurations including the second mapping configuration; and
outputting, via the second control message, an indication of the second mapping configuration from the plurality of mapping configurations, wherein the plurality of codeblock groups of the uplink message are mapped to the first codeword and the second codeword in accordance with the second mapping configuration based at least in part on the indication in the second control message.

* * * * *